(12) United States Patent
Ginther et al.

(10) Patent No.: US 7,007,763 B2
(45) Date of Patent: Mar. 7, 2006

(54) CONTROL SYSTEM FOR INTERACTIVE DRIVELINE AND VEHICLE CONTROL

(75) Inventors: Brian B. Ginther, Auburn Hills, MI (US); John A. Peterson, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/666,593

(22) Filed: Sep. 19, 2003

(65) Prior Publication Data
US 2005/0064993 A1 Mar. 24, 2005

(51) Int. Cl.
B62D 6/00 (2006.01)
(52) U.S. Cl. .................................. 180/6.2
(58) Field of Classification Search ............ 701/67, 701/69, 89, 82, 87; 180/6.2, 197, 248, 233, 180/345; 192/54.1; 477/174–176
See application file for complete search history.

(56) References Cited

U.S. PATENT DOCUMENTS

| | | | | |
|---|---|---|---|---|
| 4,941,097 A | * | 7/1990 | Karnopp et al. | 701/41 |
| 4,953,654 A | * | 9/1990 | Imaseki et al. | 180/197 |
| 4,973,296 A | | 11/1990 | Shibahata | |
| 5,029,660 A | * | 7/1991 | Raad et al. | 180/422 |
| 5,069,305 A | * | 12/1991 | Kobayashi | 180/249 |
| 5,183,131 A | | 2/1993 | Naito | |
| 5,328,255 A | | 7/1994 | Isella | |
| 5,332,059 A | * | 7/1994 | Shirakawa et al. | 180/197 |
| 5,341,297 A | | 8/1994 | Zomotor et al. | |
| 5,636,121 A | | 6/1997 | Tsuyama et al. | |
| 5,711,026 A | | 1/1998 | Eckert et al. | |
| 5,742,917 A | * | 4/1998 | Matsuno | 701/69 |
| 5,842,754 A | * | 12/1998 | Sano | 303/147 |
| 5,845,546 A | * | 12/1998 | Knowles et al. | 74/650 |
| 5,893,896 A | * | 4/1999 | Imamura et al. | 701/70 |
| 6,012,560 A | | 1/2000 | Kuroda et al. | |
| 6,059,067 A | | 5/2000 | Shibahata et al. | |
| 6,076,033 A | | 6/2000 | Hamada et al. | |
| 6,131,054 A | * | 10/2000 | Shibahata | 701/1 |
| 6,327,935 B1 | * | 12/2001 | Joslin et al. | 74/650 |
| 6,575,282 B1 | | 6/2003 | Perlick et al. | |
| 6,704,627 B1 | * | 3/2004 | Tatara et al. | 701/22 |
| 2004/0104056 A1 | * | 6/2004 | Perlick et al. | 180/6.2 |

FOREIGN PATENT DOCUMENTS

| | | |
|---|---|---|
| EP | 0 844 129 A2 | 5/1998 |
| EP | 0 875 690 A2 | 11/1998 |
| EP | 0 844 129 A3 | 7/1999 |
| EP | 0 875 690 A3 | 2/2000 |
| JP | 7-164926 | 6/1995 |

OTHER PUBLICATIONS

English Abstract for Japanese Patent No. 7-164926.

* cited by examiner

Primary Examiner—Lesley D. Morris
Assistant Examiner—Paul Royal, Jr.
(74) Attorney, Agent, or Firm—Brinks Hofer & Lione; Greg Dziegielewski

(57) ABSTRACT

A method and apparatus for controlling torque delivery independently, i.e., asymmetrically, to the two rear axles and wheels of a vehicle with front wheel drive provides improved vehicle handling and performance. The apparatus includes a prime mover, transaxle, power takeoff, rear axle having a pair of independently controllable modulating clutches driving respective rear axle and wheels, various vehicle sensors and a microprocessor. The method, embodied in software in the microprocessor, senses wheel speeds, yaw rate, lateral acceleration, throttle position and steering wheel angle, determines various reference values and oversteer and understeer conditions and activates one or both of the two clutches.

18 Claims, 19 Drawing Sheets

CONTROL SYSTEM FOR INTERACTIVE DRIVELINE AND VEHICLE CONTROL

BACKGROUND OF THE INVENTION

The invention relates generally to a method and apparatus for controlling torque delivery to the rear wheels of a front wheel drive vehicle and more particularly to a method and apparatus for controlling independent engagement of clutches disposed at the rear of a front wheel drive vehicle that asymmetrically provide drive torque to the respective rear wheels.

Extensive effort has been directed to many aspects of vehicle control and performance in vehicles equipped with adaptive four-wheel drive systems. Since the opportunity exists in vehicles equipped with four-wheel drive systems to monitor and control torque application to all four vehicle wheels rather than simply two wheels, as in many vehicles, the opportunity to significantly enhance the performance and performance characteristics of such vehicles also exists.

Many patented systems address and exploit the capabilities of four-wheel drive systems in manners intended to, for example, provide skid control, provide optimum acceleration and deceleration, or provide maximum acceleration and deceleration subject to maintaining vehicle control.

In addition to skid or slip sensing and control, a recent area of patent activity can be characterized as control of vehicle yaw, that is, motion of the vehicle about its Z or center, vertical axis.

For example, U.S. Pat. No. 5,332,059 teaches a four-wheel drive vehicle control system having a steering angle sensor and a clutch disposed across a rear differential. The clutch inhibits differentiation in response to sensed vehicle speed, steering angle and longitudinal and lateral acceleration.

U.S. Pat. No. 5,341,893 discloses a four-wheel drive system for a vehicle such as a tractor wherein a front differential drives left and right front wheels and torque is supplied to the rear wheels through individual clutches.

U.S. Pat. No. 6,076,033 teaches a process for controlling yaw in a motor vehicle through the generation of mutually exclusive braking and driving forces on the left and right wheels of a vehicle.

Another four-wheel drive system appears in U.S. Pat. No. 6,145,614 which discloses a four-wheel drive system having a center differential with a differentiation inhibiting device disposed across the differential and a second differential at the primary axle which also has a differentiation inhibiting clutch disposed there across. The system also includes a turn sensor and means for adjusting the extent of differentiation inhibition depending upon the speed difference between the right and left main drive wheels.

From the foregoing survey of patents directed to motor vehicle yaw control, it is apparent that improvements to the subject art are desirable.

BRIEF SUMMARY OF THE INVENTION

A method and apparatus for controlling torque delivery independently, i.e., asymmetrically, to the two rear axles and wheels of a vehicle with front wheel drive provides improved vehicle handling and performance. The apparatus includes a prime mover, transaxle, power takeoff, rear axle having a pair of independently, controllable modulating clutches driving respective rear axle and wheels, various vehicle sensors and a microprocessor. The method, embodied in software in the microprocessor, senses wheel speeds, yaw rate, lateral acceleration, throttle position and steering wheel angle, determines various reference values and oversteer and understeer conditions and activates one or both of the two clutches.

Thus it is an object of the present invention to provide a method for asymmetrically delivering torque through twin clutches to the rear axles and wheels of a front wheel drive motor vehicle.

It is a further object of the present invention to provide a method for independently controlling twin clutches in a rear axle of a front wheel drive motor vehicle to provide improved vehicle handling and control.

It is a still further object of the present invention to provide a method for controlling independent activation of left and right clutches of a rear axle of a front wheel drive motor vehicle based upon sensed wheel speeds, yaw rate, lateral acceleration, throttle position and steering wheel angle.

It is a still further object of the present invention to provide an apparatus for asymmetrically delivering drive torque to the rear axles and wheels of a front wheel drive vehicle.

It is a still further object of the present invention to provide an apparatus for independently delivering drive torque to the rear wheels of a front wheel drive motor vehicle having a twin clutch rear axle, sensors for wheel speeds, yaw rate, lateral acceleration, throttle position and steering wheel angle and a microprocessor.

It is a still further object of the present invention to provide an apparatus for a front wheel drive motor vehicle having a prime mover, transaxle, power takeoff, twin, independently modulatable clutches in a rear axle, various sensors monitoring vehicle operating conditions and a microprocessor having an output driving the modulating clutches.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
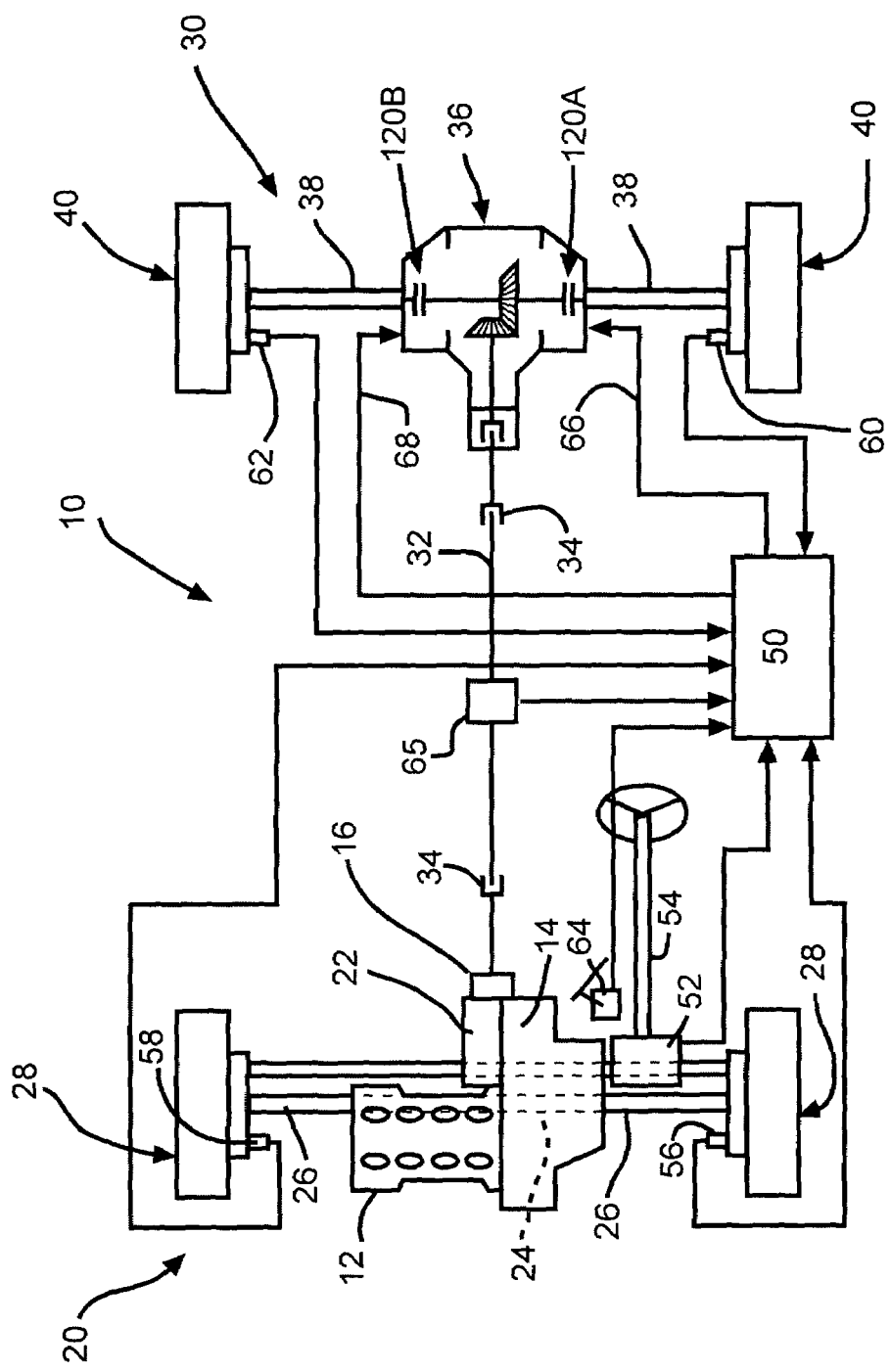
FIG. 1 is a diagrammatic, plan view of a front wheel drive motor vehicle driveline incorporating the present invention.

Referring now to FIG. 1, an adaptive four-wheel vehicle drive train is diagrammatically illustrated and designated by the reference number 10. The four-wheel vehicle drive train 10 includes a prime mover 12 such as a gasoline, diesel or natural gas fuel internal combustion engine which is coupled to and directly drives a transaxle 14. The output of the transaxle 14 drives a primary or front driveline 20 and a second or rear driveline 30. The primary driveline 20 comprises a front or primary propshaft 22, a front or primary differential 24, a pair of live front axles 26 and a respective pair of front tire and wheel assemblies 28. It should be appreciated that the front or primary differential 24 is conventional.

The transaxle 14, through a power takeoff 16, also provides drive torque to the secondary or rear drive line 30 comprising a secondary propshaft 32 having appropriate universal joints 34, a rear or secondary axle assembly 36, a pair of live secondary or rear axles 38 and a respective pair of secondary or rear tire and wheel assemblies 40. As utilized herein with regard to the secondary axle assembly 36, the term "axle" is used to identify a device for receiving drive line torque, distributing it to two generally aligned, transversely disposed drive axles and accommodating rotational speed differences resulting from, inter alia, vehicle cornering. As such, the term "axle" is intended to include the present invention which provides these functions but which does not include a conventional caged differential gear set.

The foregoing and following description relates to a vehicle wherein the primary drive line 20 is disposed at the front of the vehicle and, correspondingly, the secondary drive line 30 is disposed at the rear of the vehicle, such a vehicle commonly being referred to as a (primary) front wheel drive vehicle or adaptive four-wheel drive vehicle.

Associated with the vehicle drive train 10 is a controller or microprocessor 50 which receives signals from a plurality of sensors and provides two independent control, i.e., actuation, signals to the rear or secondary axle assembly 36. Specifically, a steering angle sensor 52 senses the angular position of the steering column 54 and steering wheel and provides an appropriate signal to the microprocessor 50. Since there is typically a direct and positive linkage between the steering column 54 and the front (steering) tire and wheel assemblies 28, the angular position of the front tire and wheel assemblies can be directly inferred and, in fact, computed from the information provided by the steering angle sensor 52. Thus, it should be understood that rotation of the steering column 54 and movement of the steering angle sensor 52 will always correspond, according to a known mathematical relationship, to the angular movement of the front tire and wheel assemblies 28. This is true of even variable ratio steering systems. Scaling factors in the microprocessor 50 can readily convert angular position of the steering column 54 to angular position of the front (steering) tire and wheel assemblies 28.

Due to such ready conversions when referring to "steering angle," such reference is to the angular position of the steering column 54 and attached steering wheel, it being understood that both the angle of the steering column 54 and angle of the front tire and wheel assemblies 28 of a given vehicle are related by a known relationship or ratio, as noted above, and that either may be sensed, if desired, and scaled and converted to the other as appropriate. In this regard, either a linear sensor (not illustrated) operably linked to a steering rack or other steering component exhibiting linear motion or an angular sensor having limited motion linked to a steering component having limited motion will function in this system. Lastly, in steer-by-wire systems, the microprocessor 50 may be fed a signal from the steering angle sensor 52 of the steer-by-wire system. All of these sensor types, sensor locations and system configurations are deemed to be within the scope of this invention. It should be appreciated, however, that the relatively significant extent of rotation of the steering column 54, typically at least three turns (1080°) lock-to-lock, provides better angular definition in the output signal of the sensor 52 relative to a sensor location exhibiting less rotational or linear movement.

The vehicle drive train 10 also includes a first variable reluctance or Hall Effect sensor 56 which senses the rotational speed of the left primary (front) tire and wheel assembly 28 and provides a signal to the microprocessor 50. A second variable reluctance or Hall Effect sensor 58 senses the rotational speed of the right primary (front) tire and wheel assembly 28 and provides a signal to the microprocessor 50. A third variable reluctance or Hall effect sensor 60 associated with the left secondary (rear) tire and wheel assembly 40 senses its speed and provides a signal to the microprocessor 50. Finally, a fourth variable reluctance or Hall effect sensor 62 associated with the right secondary (rear) tire and wheel assembly 40 senses its speed and provides a signal to the microprocessor 50. It should be understood that the speed sensors 56, 58, 60 and 62 may be independent, i.e., dedicated, sensors or may be those sensors mounted in the vehicle to provide signals for anti-lock brake systems (ABS) or other speed sensing and traction control systems. It is also to be understood that an appropriate and conventional counting or tone wheel (not illustrated) is associated with each of the respective tire and wheel assemblies 28 and 40 in proximate sensing relationship with each of the speed sensors 56, 58, 60 and 62. A throttle position sensor 64 and a yaw rate and lateral accelerator sensor 65, which may be unitary or separate devices, also provide signals to the microprocessor 50. The microprocessor 50 includes software which receives and may condition the signals from the steering angle sensor 52, the wheel speed sensors 56, 58, 60 and 62, the throttle position sensor 64 and the yaw and lateral acceleration sensor 65.

Figure 2:
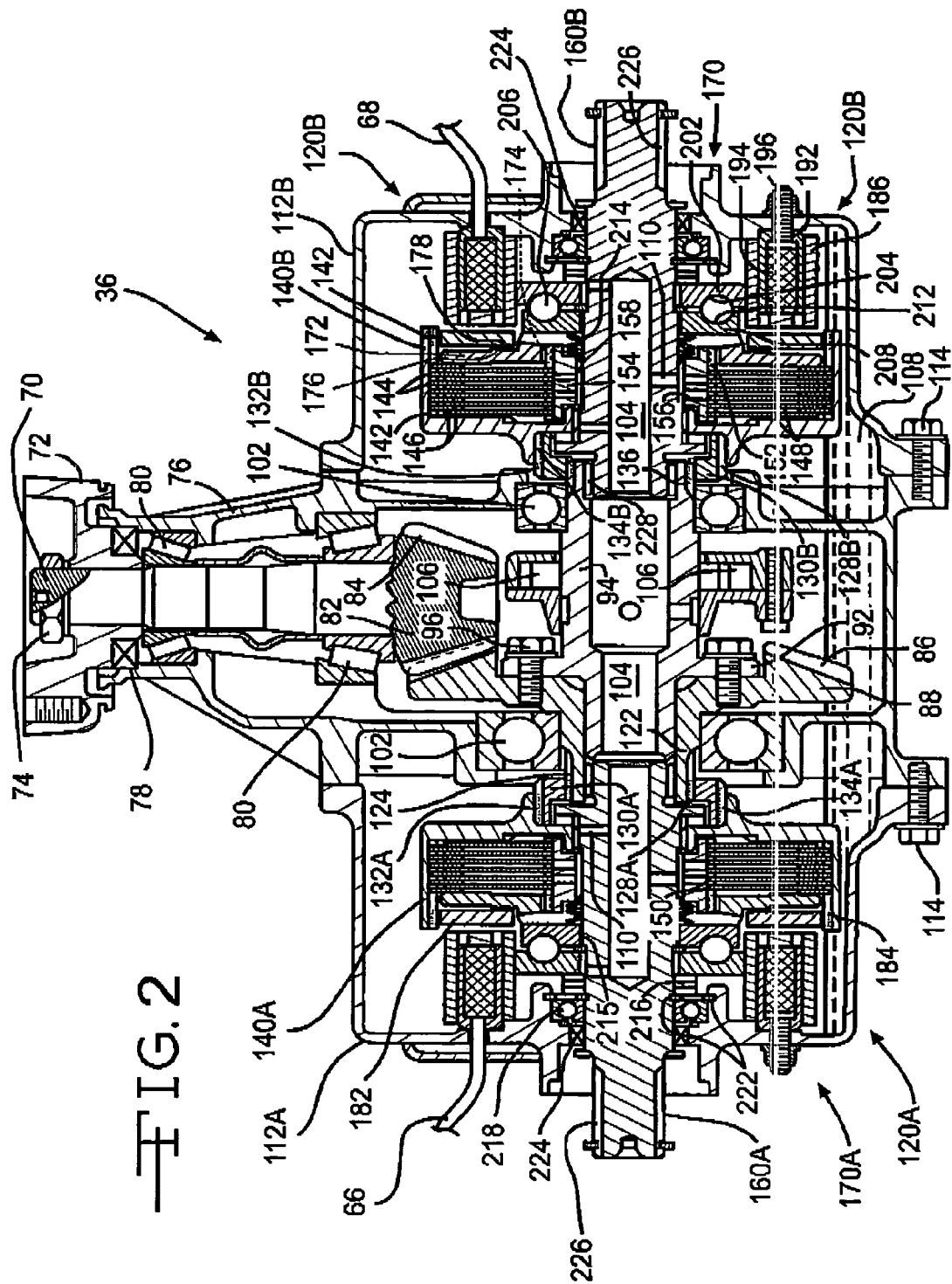
FIG. 2 is a full, sectional view of a twin modulating clutch rear axle according to the present invention.

Referring now to FIG. 2, the rear or secondary axle assembly 36 includes an input shaft 70 which receives drive torque from the secondary propshaft 32. The input shaft 70 may include a flange or cup 72 or similar component which forms a portion of, for example, a universal joint 34 or other connection to the secondary propshaft 32. The flange 72 may be retained on the input shaft 74 by a lock nut 74 or similar device. The input shaft 70 is received within a centrally disposed, axially extending center housing 76 and is surrounded by a suitable oil seal 78 which provides a fluid impervious seal between the housing 76 and the input shaft 70 or an associated portion of the flange 72. The input shaft 70 is preferably rotatably supported by a pair of anti-friction bearings such as the tapered roller bearing assemblies 80. The input shaft 70 terminates in a hypoid or bevel gear 82 having gear teeth 84 which mate with complementarily configured gear teeth 86 on a ring gear 88 secured to a flange 92 on a centrally disposed tubular drive member 94 by suitable threaded fasteners 96.

The tubular drive member 94 is rotatably supported by a pair of anti-friction bearings such as ball bearing assemblies 102. The tubular drive member 94 is hollow and defines an interior volume 104. A pair of scavengers or scoops 106 extend radially through the wall of the tubular drive member 94 and collect a lubricating and cooling fluid 108 driving it into the interior volume 104. The lubricating and cooling fluid 108 is then provided to components in the rear differential assembly 36 through passageways 110 in communication with the interior volume 104 of the tubular drive member 94.

The rear or secondary axle assembly 36 also includes a pair of bell housings 112A and 112B which are attached to the center housing 76 by threaded fasteners 114. The housings 112A and 112B are mirror-images, i.e., left and right, components which each receive a respective one of a pair of modulating clutch assemblies 120A and 120B. But for the opposed, mirror-image arrangement of the two modulating clutch assemblies 120A and 120B, the components of the two clutch assemblies 120A and 120B described below are identical. Accordingly, and for purposes of clarity in FIG. 2, numerical component callouts may appear in either or both of the left and right clutch assemblies 120A and 120B, it being understood that such components reside in and such callouts refer to both assemblies.

Both of the modulating clutch assemblies 120A and 120B are driven by the input shaft 70 through the bevel gears 82 and 88 and the tubular drive member 94. Specifically, the ring gear 88, which as noted above, is secured to the tubular drive member 94. A tubular extension 122 of the ring gear 88 includes external or male splines 124, which mate with internal or female splines or gear teeth 128A, formed on a left drive collar 130A. The left drive collar 130A also includes external or male splines or gear teeth 132A which mate with complementarily configured internal or female splines or gear teeth 134A on a clutch end bell 140A. With regard to the drive to the right modulating clutch assembly 120B, the tubular drive member 94 includes external or male splines or gear teeth 136, which engage complementarily configured female splines or gear teeth 128B and the drive collar 130B. Correspondingly, the drive collar 130B includes male or external splines or gear teeth 132B which are complementary to and engage internal or female splines or gear teeth 134B formed on a clutch end bell 140B.

The clutch end bells 140A and 140B are identical but disposed in mirror image relationship. Each of the clutch end bells 140A and 140B includes internal splines 142 which drivingly engage complementarily configured external splines 144 on a first plurality of larger diameter friction clutch plates or discs 146. Interleaved with a first plurality of larger diameter friction clutch plates or discs 146 is a second plurality of smaller diameter friction clutch plates or discs 148. At least one face of each of the friction clutch plates or discs 146 and 148 includes suitable friction clutch material. Each of the smaller diameter friction clutch plates or discs 148 includes internal or female splines 150 which engage complementarily configured male or external splines 152 on a circular collar or hub 154. The hub 154 is, in turn, coupled by internal or female splines or gear teeth 156 to male splines or gear teeth 158 on respective left and right output shafts 160A and 160B for rotation therewith.

The modulating clutch assemblies 120A and 120B also include ball ramp actuator assemblies 170A and 170B. The ball ramp actuator assemblies 170A and 170B each include a circular apply plate 172 which includes female splines or internal gear teeth 174 which mate with the male splines 152 on the collar or hub 154. The apply plate 172 thus rotates with the second plurality of clutch plates 148 and may move axially relative thereto. The apply plate 172 may include a shoulder 176 which positions and receives a flat washer 178 which engages an armature 182. The armature 182 includes male splines 184 about its periphery which are complementary to and engage the female splines 142 on the interior of the end bells 140A and 140B. Thus, the armature 182 rotates with the end bell 140A and the first plurality of clutch plates 146. The armature 182 is disposed adjacent a U-shaped circular rotor 186. The rotor 186 partially surrounds a stationary housing 192 which contains an electromagnetic coil 194. The stationary housing 192 and the coil 194 are preferably secured to the bell housings 112A and 112B by a plurality of threaded studs and fasteners 196. Electrical energy may be provided to the electromagnetic coils 194 through respective left and right electrical conductors 66 and 68.

Coupled to the rotor 186 by any suitable means such as weldments, interengaging splines or an interference fit is a first circular member 202. The first circular member 202 defines a loose, freely rotating fit about the output shafts 160A and 160B and thus the first circular member 202 and the rotor 186 are free to rotate about the output shafts 160A and 160B and the housings 192 of the electromagnetic coils 194. The first circular member 202 includes a plurality of curved ramps or recesses 204 arranged in a circular pattern about the axis of the output shaft 160B. The ramps or recesses 204 represent oblique sections of a helical torus. Disposed within each of the recesses 204 is a load transferring ball 206 or similar load transferring member which translates along the ramps defined by the oblique surfaces of the recesses 204.

A second circular member 208 is disposed in opposed relationship with the first circular member 202 and includes a like plurality of complementarily sized and arranged recesses 212. The load transferring balls 206 are thus received within the pairs of opposing recesses 204 and 212, the ends of the recesses 204 and 212 being curved and much steeper in slope than the interior regions of the recesses such that the load transferring balls 206 are effectively trapped therein. A plurality of wave washers or Belleville springs 214 are disposed between the second circular member 208 and the hub or collar 154 and bias the second circular member 208 toward the first circular member 202.

It will be appreciated that the recesses 204 and 212 and the load transferring balls 206 may be replaced with other analogous mechanical elements which cause axial displacement of the circular members 202 and 208 in response to relative rotation therebetween. For example, tapered rollers disposed in complementarily configured conical helices may be utilized.

The second circular member 208 includes a plurality of female splines or gear teeth 215 which are complementary to and engage the male splines or external gear teeth 158 on the output shaft 160B. The axial position of the first circular member 202 is established by a thrust bearing assembly 216. Adjacent the thrust bearing assembly 216 is an anti-friction bearing such as a ball bearing assembly 218 which rotatably supports and axially locates the output shaft 160B. The ball bearing assembly 218 is retained by a pair of snap rings 222 and axially positions the output shaft 160B relative to the bell housing 112B. Adjacent the ball bearing assembly 218 and the terminus of the output shaft 160B is an oil seal 224.

The terminal portion of the output shaft 160B may include male splines 226, a flange or other component which facilitates driving connection to the adjacent rear axle 38. The opposite ends of the drive shafts 160A and 160B are rotatably supported in a cylindrical journal bearing, a bushing or a roller bearing assembly 228 received within the tubular drive member 94.

Figure 3:
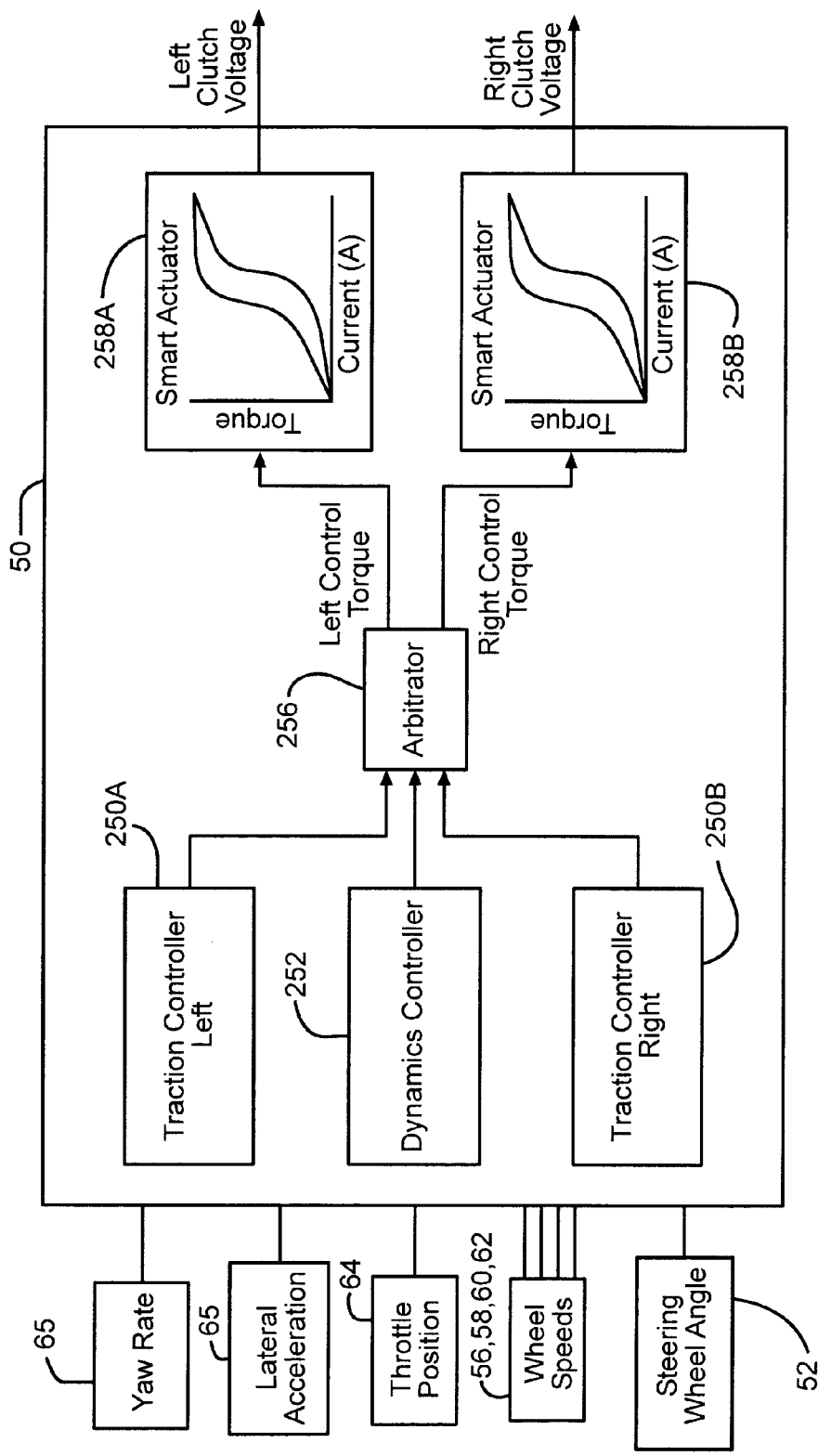
FIG. 3 is a block diagram of the control architecture residing in a microprocessor according to the present invention.
Figure 14A:
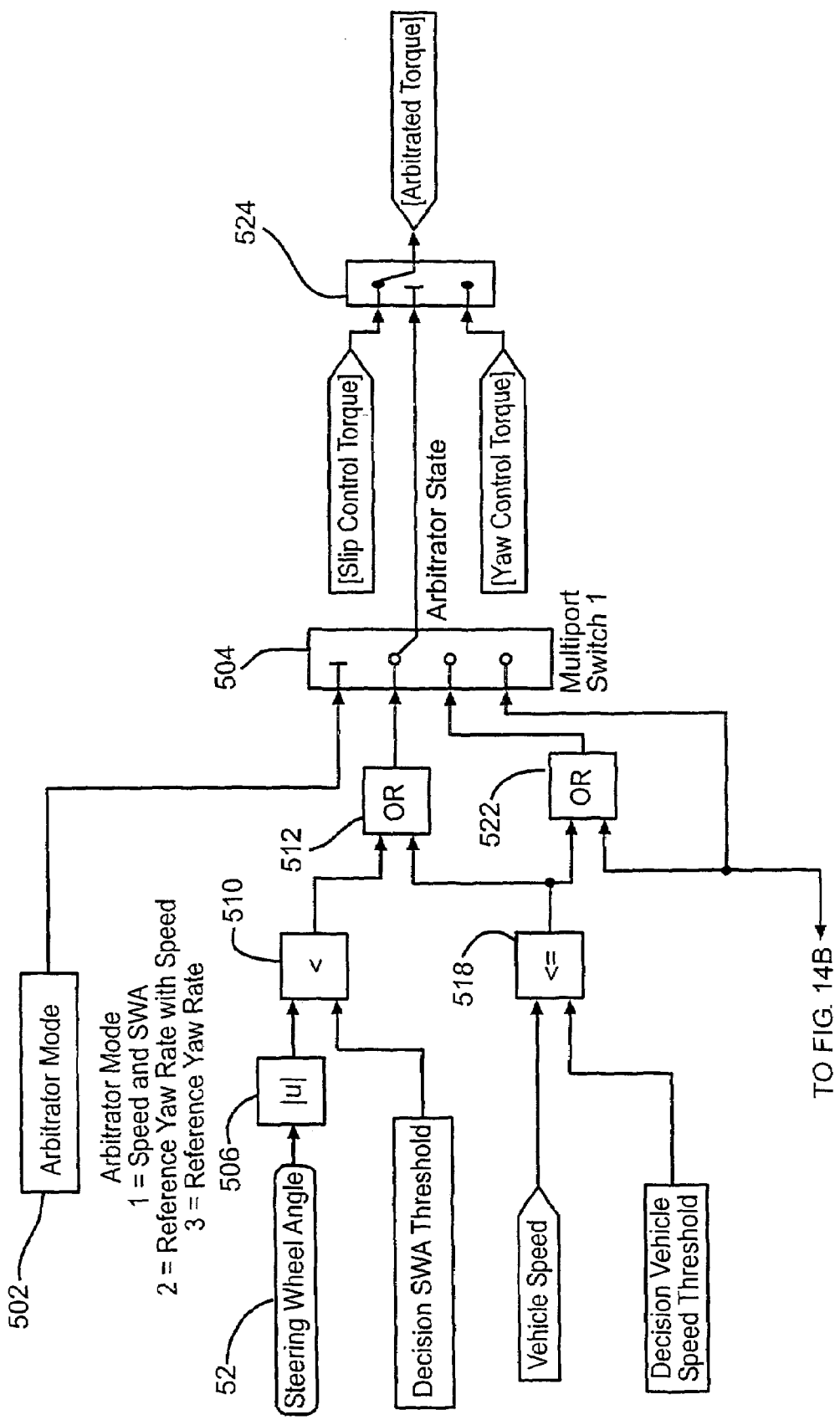
FIGS. 14A, 14B and 14C are flow charts relating to the arbitrator module illustrated in FIG. 3.

Referring now to FIG. 3, the microprocessor 50 includes several modules which receive data from one or more of the various sensors, including the steering wheel angle sensor 52, the wheel speed sensors 56, 58, 60, and 62, the throttle position sensor 64 and the yaw rate and lateral acceleration sensors 65. The microprocessor 50 includes six modules or building blocks including left and right traction controller modules 250A and 250B which are described in greater detail in FIG. 4, a dynamics controller module 252 which is described in greater detail in FIG. 5, an arbitrator module 256 which is described in greater detail in FIGS. 14A, 14B and 14C, and left and right smart actuator modules 258A and 258B which are described in greater detail in FIG. 6.

Figure 4:
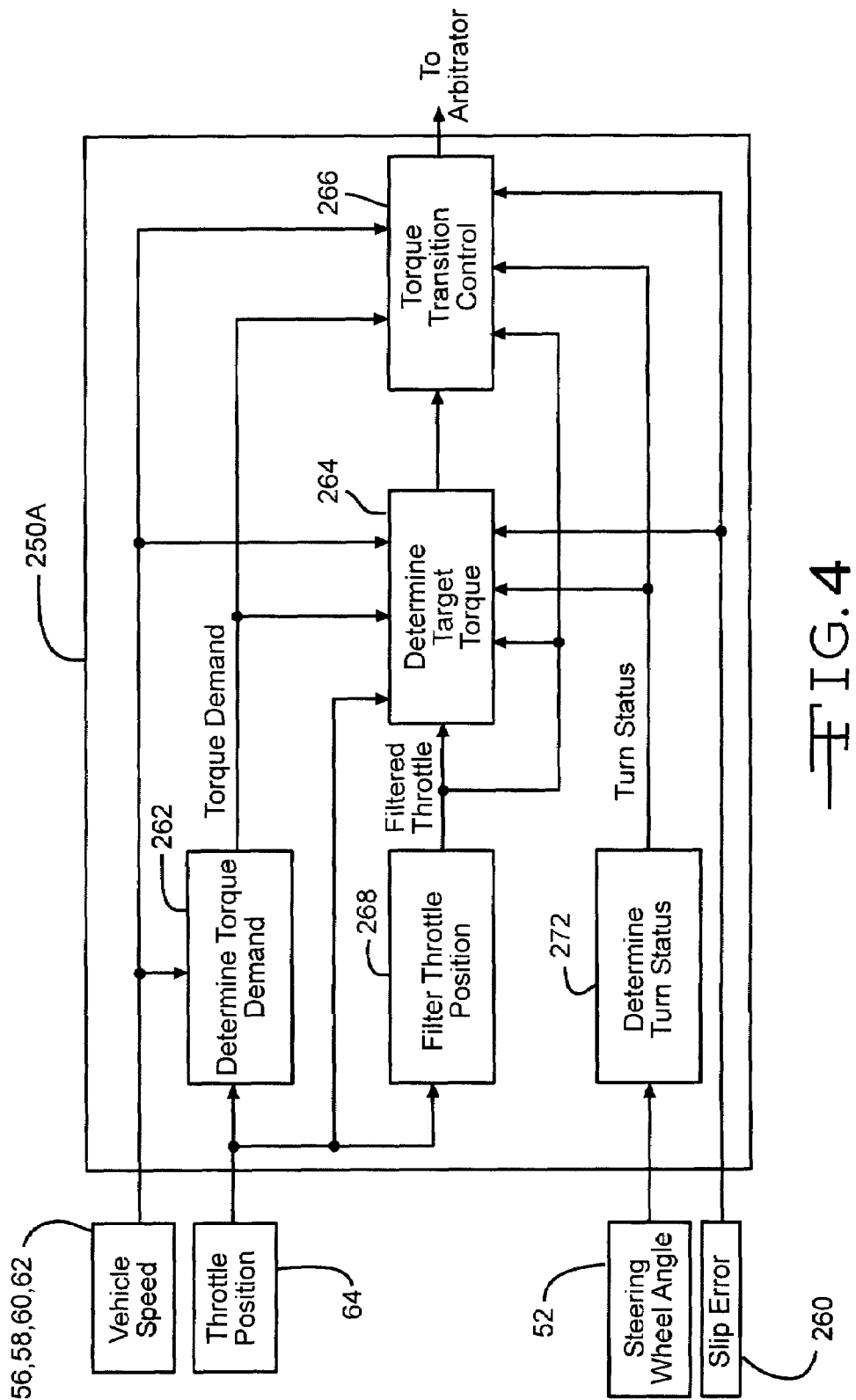
FIG. 4 is a block diagram of one of the traction controller modules residing in the microprocessor according to the present invention.

Turning then to FIG. 4, the right and left traction controller modules 250A and 250B are the same and thus only the left traction controller module 250A will be described. Both modules 250A and 250B read the vehicle speed by being provided with the speed from all four wheel speed sensors 56, 58, 60 and 62, and also receive a signal from the steering wheel angle sensor 52, and the throttle position sensor 64. The slip error signal is optional and, when utilized represents the difference between actual wheel slip and calculated or expected wheel slip. From the vehicle speed and throttle position signals, a torque demand is determined by a subroutine 262. The output of the torque demand subroutine 262 is provided both to a second subroutine 264 which determines a target torque and also to a third subroutine 266 which provides a torque transition signal. The throttle position from the throttle position sensor 64 is also provided to a conditioning or filtering subroutine 268 which provides a filtered throttle signal to the target torque subroutine 264. The steering wheel angle from the steering angle sensor 52 is provided to a subroutine 272 which provides a signal relating to the status of the turn, either right or left, which is provided to both the second subroutine 264 and the third subroutine 266. The optional slip error signal in the line 260 is also provided to the subroutines 264 and 266. The outputs of both the left traction controller module 250A and the right traction controller module 250B are provided to the arbitrator module 256, as illustrated in FIG. 3.

Figure 5:
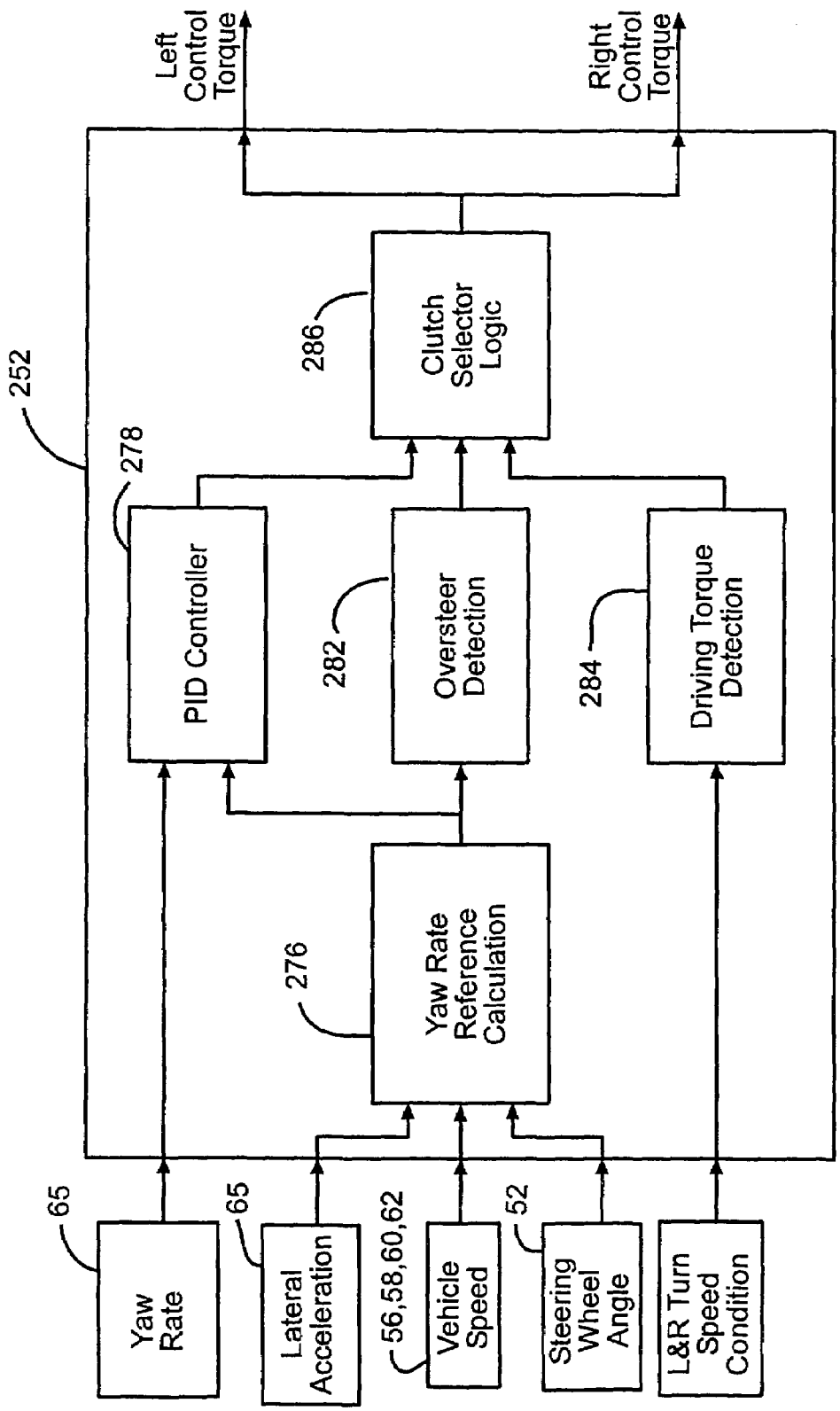
FIG. 5 is a block diagram of the dynamics controller module residing in the microprocessor according to the present invention.

Referring now to FIG. 5, the dynamics controller module 252 illustrated in FIG. 3, is shown in greater detail. The dynamics controller 252 accepts signals from the vehicle speed sensors 56, 58, 60, 62, from the steering wheel angle sensor 52 and the yaw rate and lateral acceleration sensor 65. It also receives a signal relating to the left and right turn speed condition which will be described subsequently. Several of the signals are provided to the yaw rate reference calculation subroutine 276 which is described in greater detail in FIG. 8. A proportional integral differential (PID) controller module 278 which receives a signal directly from the yaw rate sensor 65 and an output signal from the subroutine 276 is illustrated in greater detail in FIG. 14C. The yaw rate reference module 252 also includes an oversteer detection module 282 which receives a signal from the yaw rate reference subroutine 276. The oversteer detection subroutines are presented in FIGS. 10, 11, 12A, 12B, 13A and 13B. The dynamics controller module 252 also includes a driving torque detection subroutine 284 which receives the left and right turn speed condition signal. The outputs of the subroutines 278, 282 and 284 are provided to a clutch selector logic subroutine 286 which is illustrated in FIGS. 9A and 9B. The clutch selector logic subroutine 286 provides right and left torque control outputs to the smart actuator modules 258A and 258B, respectively, as illustrated in FIG. 3.

Figure 6:
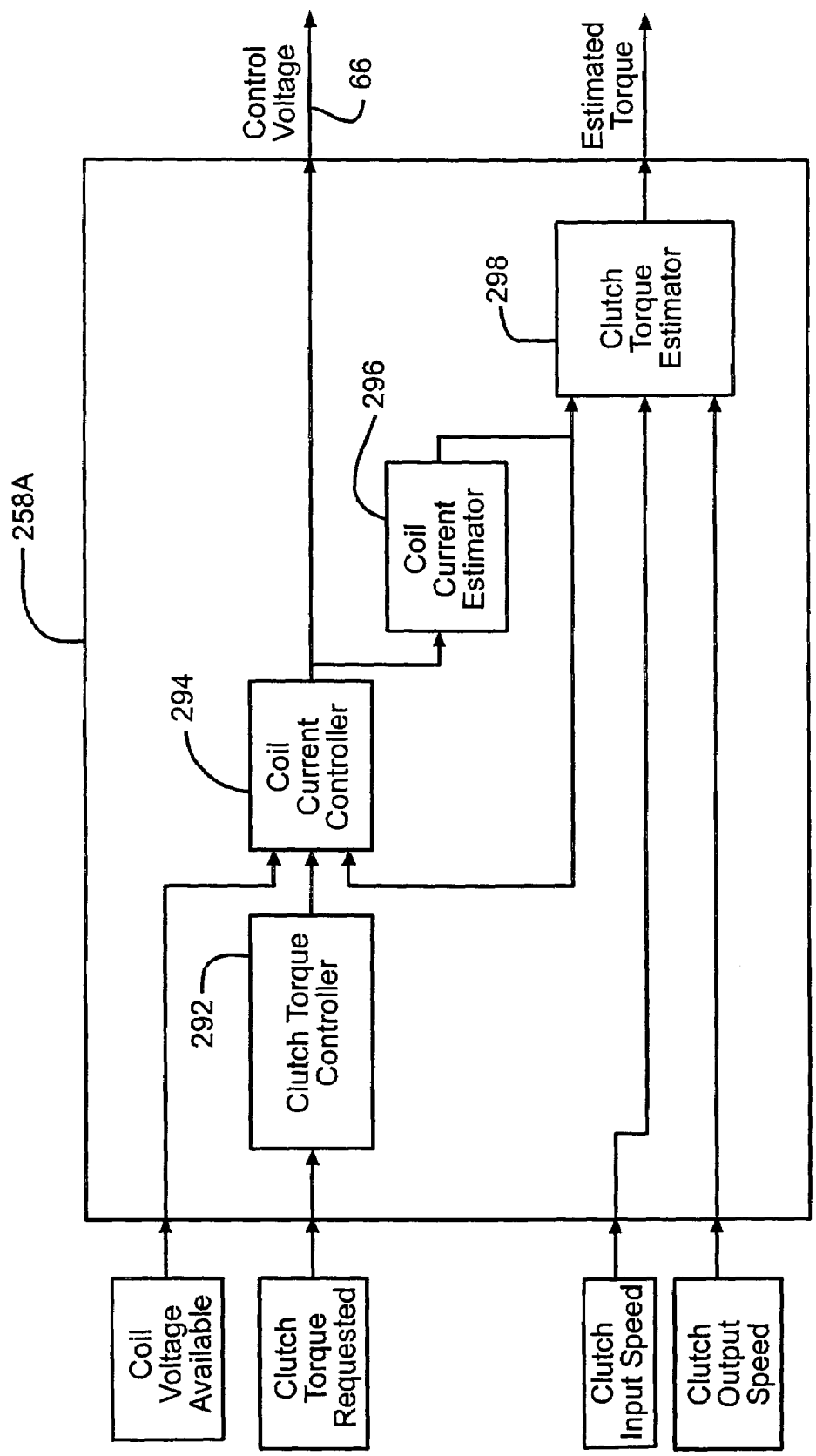
FIG. 6 is a block diagram of one of the smart actuator modules residing in the microprocessor according to the present invention.

Referring now to FIG. 6, one of the two smart actuator modules 258A is illustrated, it being understood that the modules 258A and 258B, but for their separate and dedicated nature to provide electrical energy to the right and left electromagnetic clutch assemblies 120A and 120B, respectively, are the same. The module 258A receives a signal from the electrical system of the motor vehicle indicating the currently available voltage to be supplied to the electromagnetic coil 194A. The smart actuator module 258A also receives a signal from the clutch selector logic subroutine 286 which is the level of the torque application requested. The module 258A also receives a signal indicating the input speed of the clutch which may be derived by averaging the signals from the front wheel speed sensors 56 and 58 and also a clutch output speed signal which may be derived by averaging the speeds of the rear wheel speed sensors 60 and 62. Alternatively, a single sensor (not illustrated) sensing the speed of the secondary propshaft 32 or a directly coupled component may be utilized to sense the clutch input speed. A clutch torque controller 292 received the clutch torque requested, conditions the torque level request and provides it to a coil current controller 294 which also is provided with the presently available electrical system voltage. The coil current controller 294 provides an output signal in the line 66 to the left coil 194 of the electromagnetic clutch assembly 120A and may utilize a pulse width modulation (PWM) control scheme or any other control scheme capable of providing a modulating, i.e., proportional, electrical signal to the coil 194. A coil current estimator 296 also receives the control voltages and drives, with the clutch input and output speeds, a clutch torque estimator 298 which provides a signal representing an estimated torque level.

Figure 7:
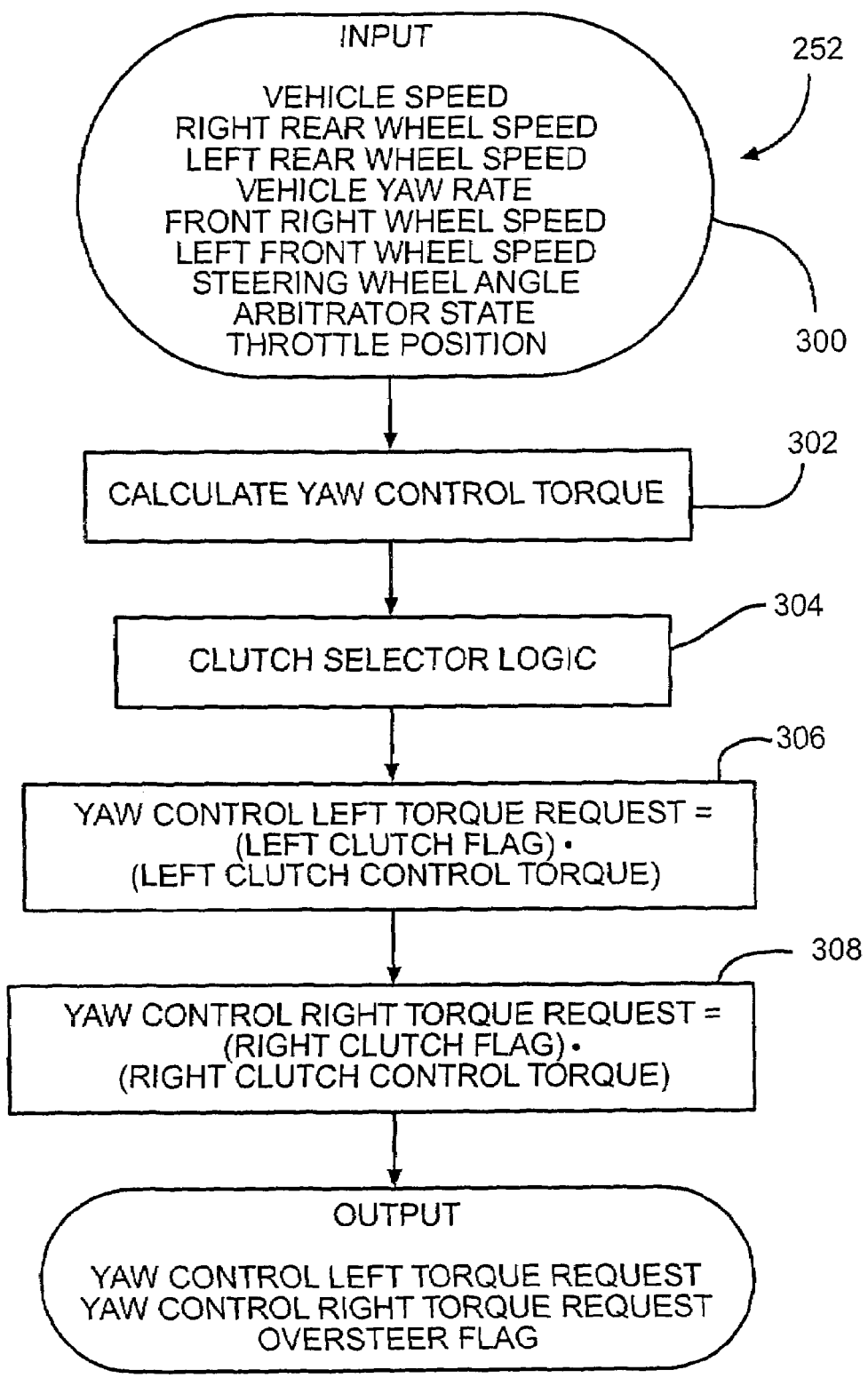
FIG. 7 is a flow chart illustrating the sequence of steps undertaken by the dynamics controller module illustrated in FIG. 5.

Referring now to FIG. 7, a flow chart presenting the steps of the dynamics controller module 252 illustrated in both FIGS. 3 and 5 is illustrated. The dynamics controller module 252 receives inputs from the four vehicle speed sensors 56, 58, 60 and 62 which then may be utilized to compute the vehicle speed and also receives signals from the steering wheel angle sensor 52, the throttle position sensor 64 and the yaw rate and lateral acceleration sensor 65. A signal representing the current state of the arbitrator module 256 is also provided. This data is initialized or stored as needed at an initialization point 300 and utilized in a process step 302 to calculate a yaw control torque according to the flow chart illustrated in FIG. 8. The calculated yaw control torque is then utilized in a process step 304 to determine and enable the clutch selector logic set forth in the flow charts appearing in FIGS. 9A and 9B. In turn, this data is utilized in a process step 306.

The process step 306 provides a yaw control left torque request which is the product of a left clutch flag (one if the flag is set or zero if the flag is not set) times the left clutch control torque. In other words, if the left clutch flag is not set, the yaw control left torque request will be zero. If the left clutch flag is set, i.e., is equal to one, the yaw control left torque request will be the left clutch control torque. This is followed by a similar process step 308 which correspondingly determines the yaw control right torque request which is the product of the right clutch flag (either zero for off or one for on) times the right clutch control torque. Thus, if the right control clutch flag is set, i.e., is equal to one, the yaw control right torque request equals the right clutch control torque. If the right clutch flag is not set, the yaw control right torque request equals zero. These signals and an oversteer flag represent the output of the dynamics controller module 252.

Figure 8:
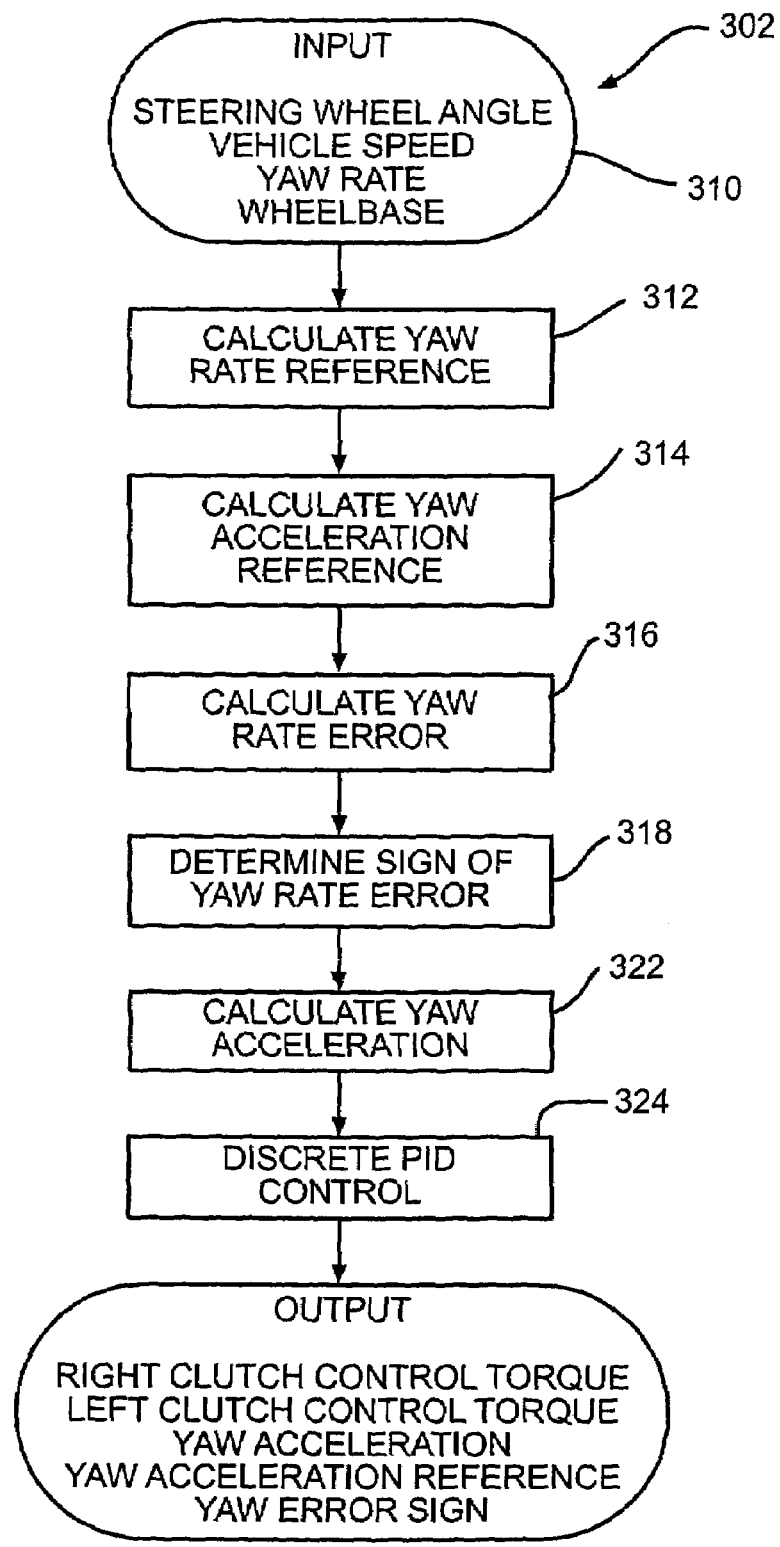
FIG. 8 is a flow chart of the yaw rate calculation illustrated in FIG. 5.
Figure 9A:
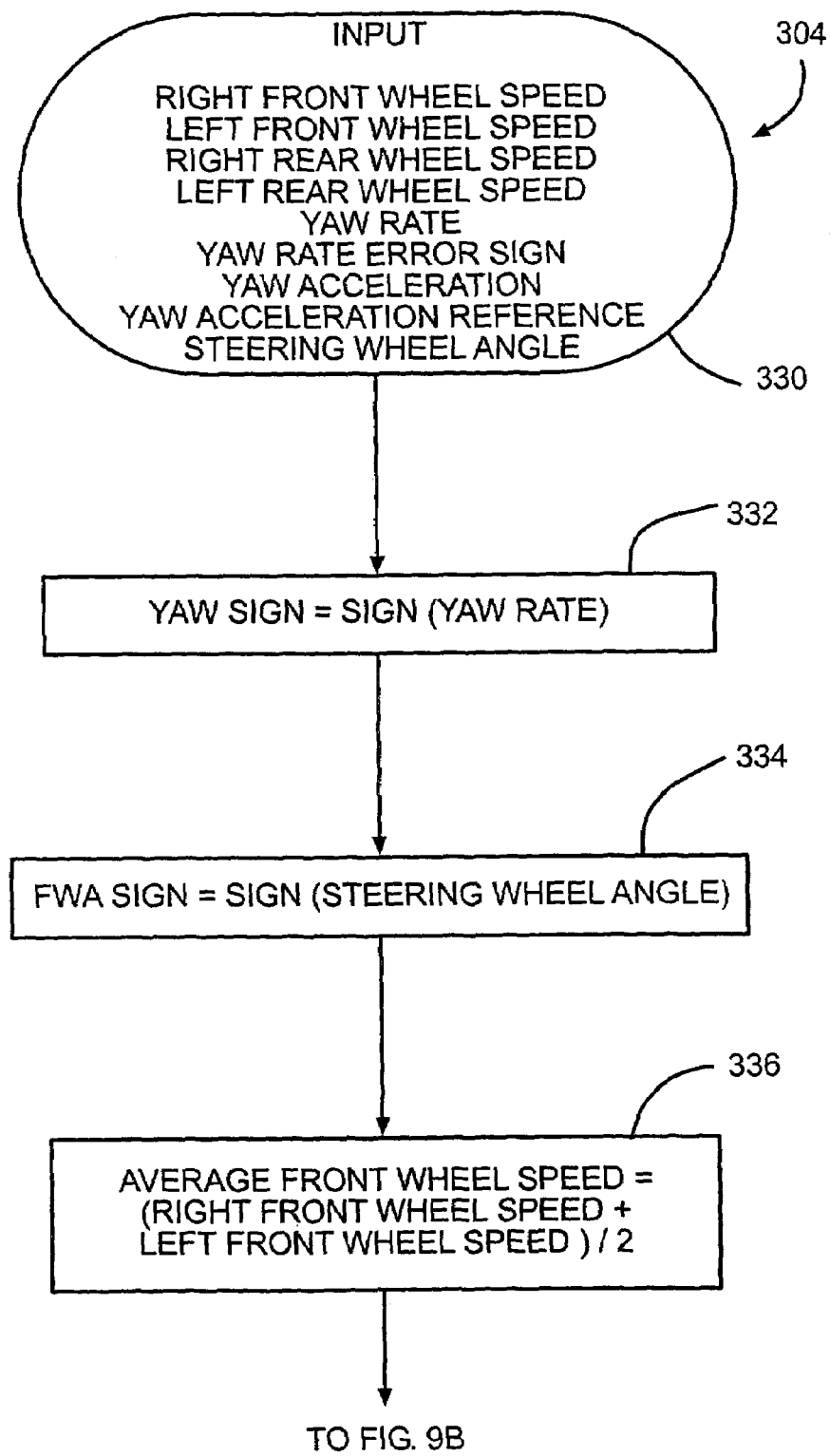
FIGS. 9A and 9B are flow charts of the clutch selector logic illustrated in FIG. 5.
Figure 9B:
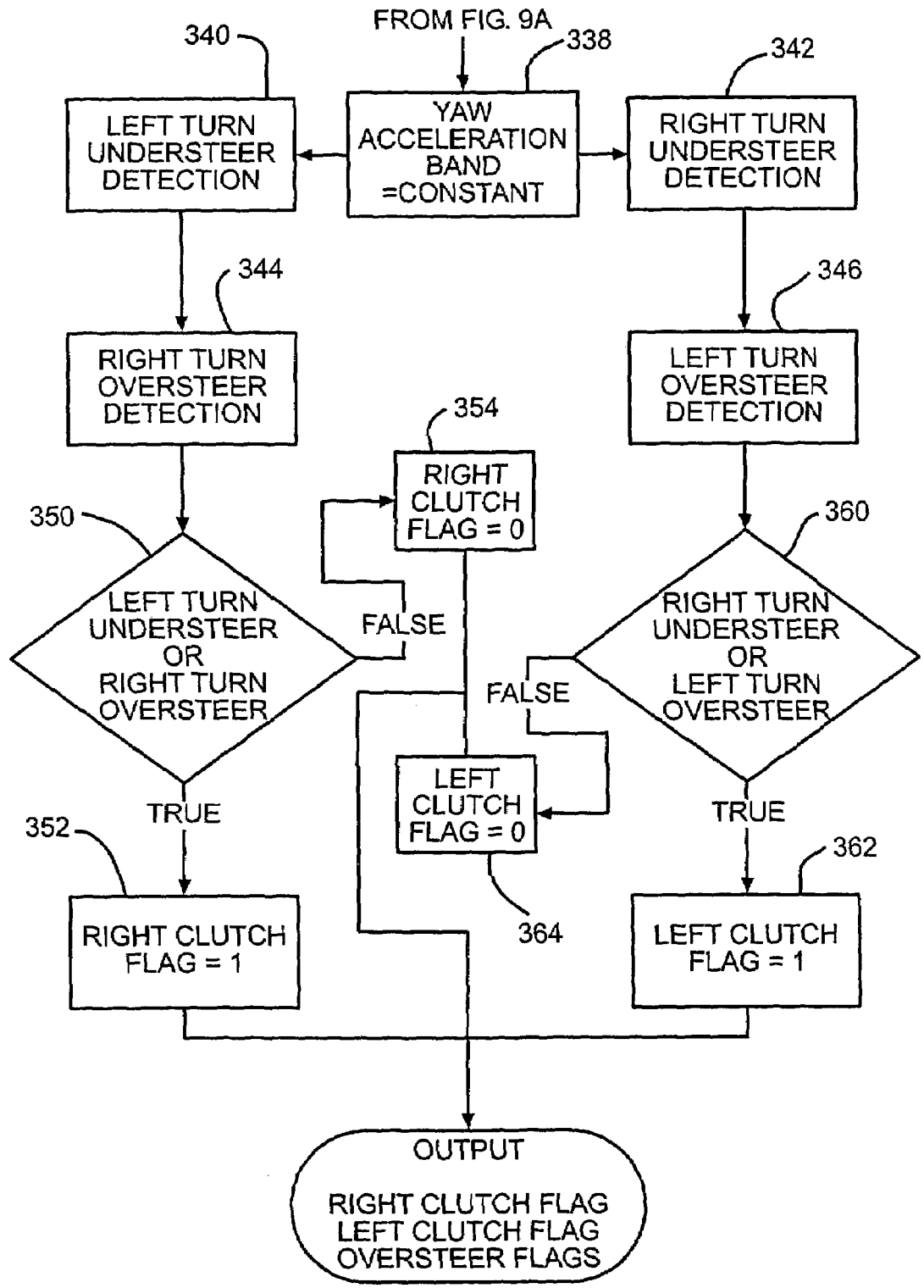

Turning then to FIG. 8, which explains in detail the process step/subroutine 302 of the dynamics controller module 252 illustrated in FIG. 7, the calculation of the yaw control torque utilizes the signals from the steering wheel angle sensor 52, the vehicle speed which may be the average of the four sensors 56, 58, 60 and 62 or vehicle speed information determined by other sensors and processes, the yaw rate sensor 65 and a fixed value (stored in memory) relating to the wheelbase of the vehicle which are all read and stored in an initializing step 310. The subroutine 302 then moves to a process step 312 which calculates a yaw rate reference value. Using a PID controller, such as the controller 278 illustrated in FIG. 5, requires that an error signal be calculated which requires that a reference signal also be calculated.

The yaw rate reference used in the PID controller 278 is a linear representation of yaw rate for a neutral steer vehicle which is represented in the equation $$\dot{\psi}\ ref = \frac{\delta_f V}{I}$$

wherein $\psi$ equals yaw rate, $\delta_f$ equals the angle of the front wheels of the vehicle, which as noted above, may be calculated from the steering wheel angle sensor 52, V equals the speed of the vehicle and I equals the wheel-base.

This equation may be multiplied by a gain K to permit tuning of the vehicle characteristics from understeer to oversteer:

$$\dot{\psi}\ ref = k_{ref} \frac{\delta_f V}{I}.$$

This reference signal is accurate at relatively low lateral accelerations and is sufficient for use in this system. Greater accuracy and higher lateral acceleration can be achieved by representing the curvature response to a steer angle through use of the equation $$\dot{\psi}\ ref = \frac{\delta_f V}{I(1 + KV^2)}.$$

The subroutine 302 then moves to a process step 314 which takes the derivative of the calculated yaw rate to provide a yaw acceleration reference value. In the process step 316, a yaw rate error is calculated through use of the equation $\psi$ error=$\psi$ ref −$\psi$ measured, the $\psi$ being calculated in the process step 312. Next, the subroutine 302 moves to a process step 318 which reads the sign of the yaw rate error. If the reference yaw rate is greater than the measured yaw rate, this value is positive; if the reference yaw rate I is less than the measured yaw rate, this value is negative. In a process step 322, the yaw acceleration is calculated and these various values are used in a process step for the PID controller 278 to generate the right or left torque request according to the equation $$T_{request} = K_P \dot{\psi}\ error + K \int \dot{\psi}\ error + K_D \left(\frac{d}{dt} \dot{\psi}\ error\right).$$

The subroutine 302 then provides a right clutch control torque, a left clutch control torque as well as the calculated values of the yaw acceleration, the yaw acceleration reference value and the yaw error sign.

Returning briefly to FIG. 7, the subroutine 302 then moves to the subroutine 304 which is the clutch selector logic which is described in greater detail in FIGS. 9A and 9B.

Referring then to FIGS. 9A and 9B, the clutch selector logic subroutine 304 utilizes input data from the right front wheel speed sensor 58, the left front wheel speed sensor 56, the right rear wheel speed sensor 62 and a left rear wheel speed sensor 60, the yaw rate error sign, the yaw acceleration, the yaw acceleration reference yaw rate, and data from the steering wheel angle sensor 52. This information is provided to a process step 332 which sets the yaw sign as the sign of the yaw rate. The subroutine 304 then moves to a second process step 334 which sets the sign of the front wheel angle as the sign of the steering wheel angle. This is simply a positive or negative sign depending upon the current left of center or right of center position of the steering column 54 and the convention (either Society of Automotive Engineers (SAE) or the International Standards Organization (ISO) utilized. According to the SAE standard or convention left of center is positive and right of center is negative. The ISO standard is the opposite. The process step 336 determines the average front wheel speed by adding the speed of the right front wheel and the speed of the left front wheel and dividing by two.

Figure 10:
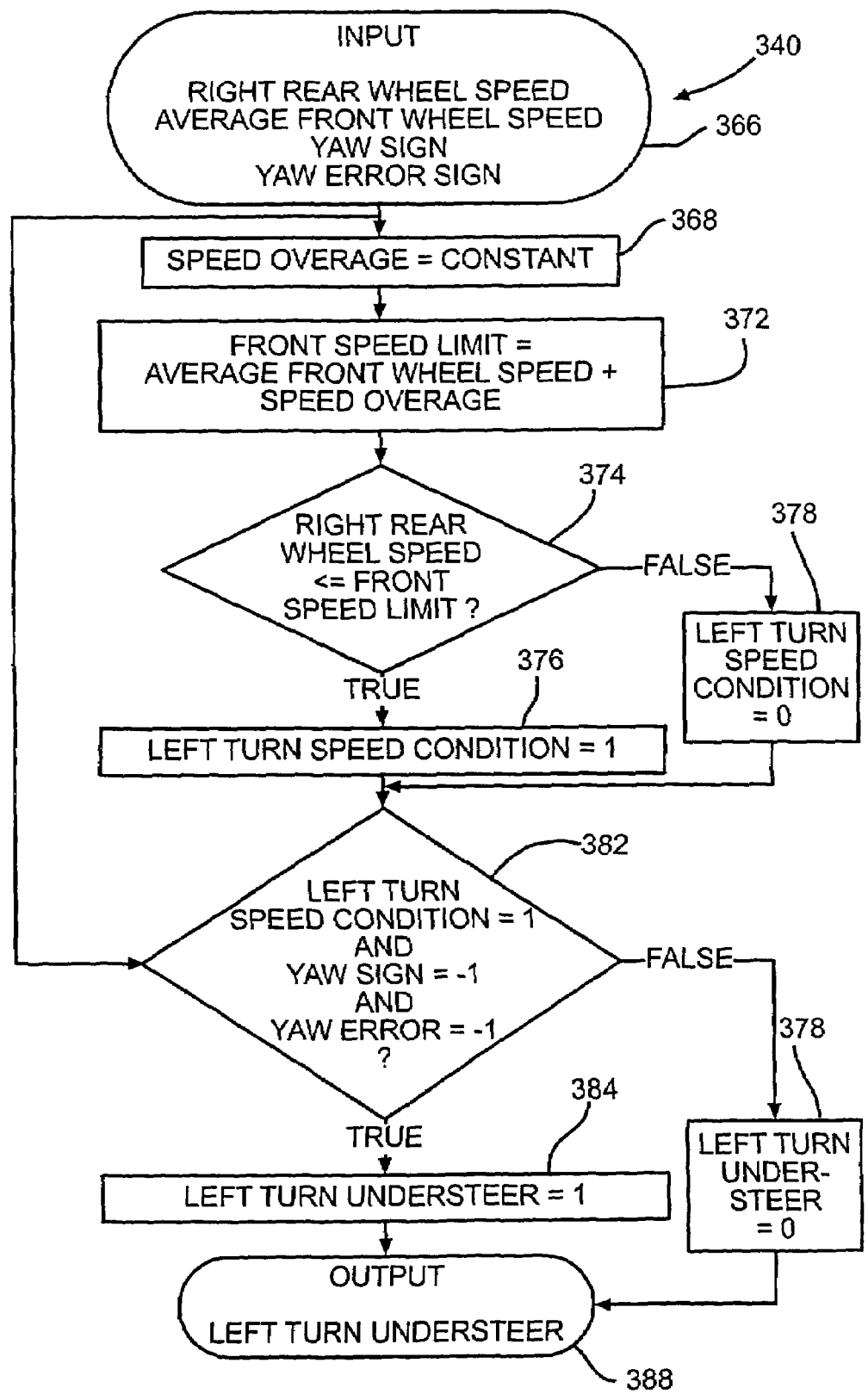
FIG. 10 is a flow chart relating to the left turn understeer detection subroutine illustrated in FIG. 9B.

The subroutine 304 then moves to a process step 338 which sets the yaw acceleration band to a constant value. The subroutine 304 then branches and determines both left and right understeer and oversteer. Specifically, left turn understeer is detected in a subroutine 340 which is illustrated in FIG. 10. Right turn oversteer is detected in a subroutine 342 illustrated in FIG. 11. Similarly, right turn understeer is detected in a subroutine 344 illustrated in FIGS. 12A and 12B and left turn oversteer is detected in a subroutine 346 illustrated in FIGS. 13A and 13B. When either left turn understeer or right turn understeer has been detected, a decision point 350 is exited at TRUE and a process step 352 sets a right clutch flag. If the decision point 350 determines that there is no left turn understeer or right turn oversteer, the decision point 350 is exited at FALSE and the right clutch flag is set at zero in a process step 354. Correspondingly, if right turn understeer or left turn oversteer is detected, a decision point 360 is exited at TRUE and a left clutch flag is set in a process step 362. Contrariwise, if the decision point 360 is exited at FALSE, since no right turn understeer or left steer oversteer is detected, a process step 364 sets a left clutch flag at zero. The clutch selector logic subroutine 304 output thus includes right and left clutch flags which may be set or not set and oversteer flags which may be set or not set as will be described with regard to FIGS. 10, 11, 12A, 12B, 13A and 13B.

Referring now to FIG. 10, the left turn understeer detection subroutine 340 is illustrated. The left turn understeer detection subroutine 340 begins within an initialization step 366 which reads the right rear wheel speed from the sensor 62, reads the average front wheel speed which may be recomputed or computed from the process step 336 illustrated in FIG. 9A, reads the yaw sign and reads the yaw error sign. The subroutine 340 then moves to a process step 368 which reads a constant predetermined value as a speed overage value. The speed overage value is a tunable parameter which may be empirically or experimentally determined is typically in a range of from zero to a percent of the maximum vehicle speed.

The subroutine 340 then moves to a process step 372 which determines a front wheel speed limit by adding together the previously computed average front wheel speed plus the speed overage value read in the process step 368. Next, a decision point 374 is entered which determines whether the right rear wheel speed is less than or equal to the front speed limit. If this proposition is TRUE, the left turn speed condition is set at one or logic high in a process step 376. If this proposition is FALSE, a left turn speed condition is set to zero and the subroutine 340 proceeds to a second decision point 382 which determines if the left turn speed condition equals one and the yaw sign equals minus one and the yaw error equals minus one. If all three of these conditions are TRUE, the decision point 382 is exited at TRUE and the left turn understeer value is set to one or logic high in a process step 384. If the inquiry of the decision point 382 is not true, it is exited at FALSE and proceeds to a process step 386 which sets the left turn understeer at zero. The output 388 of the left turn understeer detection subroutine 340 is thus a positive, logic high or one if there is left turn understeer and a logic low zero or null value if there is not left turn understeer.

Figure 11:
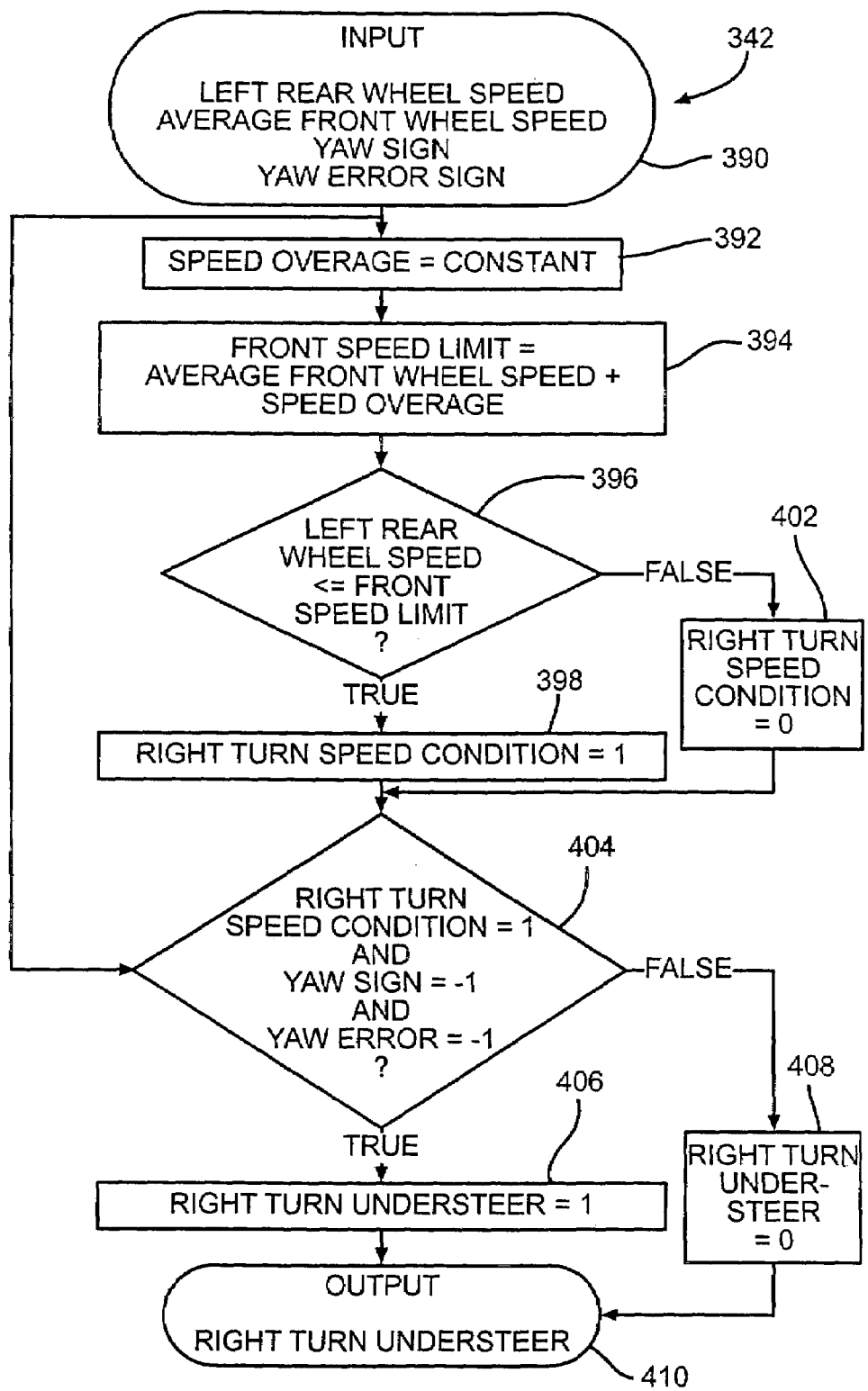
FIG. 11 is a flow chart relating to the right turn understeer detection subroutine illustrated in FIG. 9B.

Turning then to FIG. 11, the right turn understeer detection subroutine 342 is illustrated. Essentially, the right turn understeer detection subroutine 342 includes the same process steps and decision points as the left turn understeer detection subroutine 340 described directly above. Nonetheless, for reasons of clarity and completeness, it will be fully described. The right turn understeer detection subroutine 342 is provided with data and signals including the left wheel rear speed from the sensor 60. The average front wheel speed as computed in the clutch selector logic subroutine 304 and the yaw sign and the yaw error sign are provided in the initialization step 390. The subroutine 342 then moves to a process step 392 which reads a speed overage value which is equal to a predetermined constant. In a process step 394, a front wheel speed limit is determined which is the sum of the average front wheel speed and the speed overage value.

The subroutine 340 then moves to a decision point 396 which determines whether the left rear wheel speed is less than or equal to the front wheel speed limit determined in the step immediately above. If this condition is TRUE, a process step 398 is entered which sets the right turn speed condition equal to logic high or one. If this condition is not true, the decision point 396 is exited at FALSE and the subroutine 342 moves to a process step 402 which sets the right turn speed condition equal to logic low, zero or null. Next, a decision point 404 is entered which determines whether the right turn speed condition is equal to one, and the yaw sign is equal to minus one and the yaw error is equal to minus one. If all of these conditions are true, the decision point 404 is exited at TRUE and the subroutine 342 moves to a process step 406 which sets a right turn understeer flag or value at logic high or one. If not all of these conditions are TRUE, the decision point 404 is exited at FALSE and a process step 408 sets a right turn understeer value or flag at logic low, zero or null. An output 410 of the right turn understeer detection subroutine 342 provides this right turn understeer value or flag to other subroutines and systems as necessary.

Figure 12A:
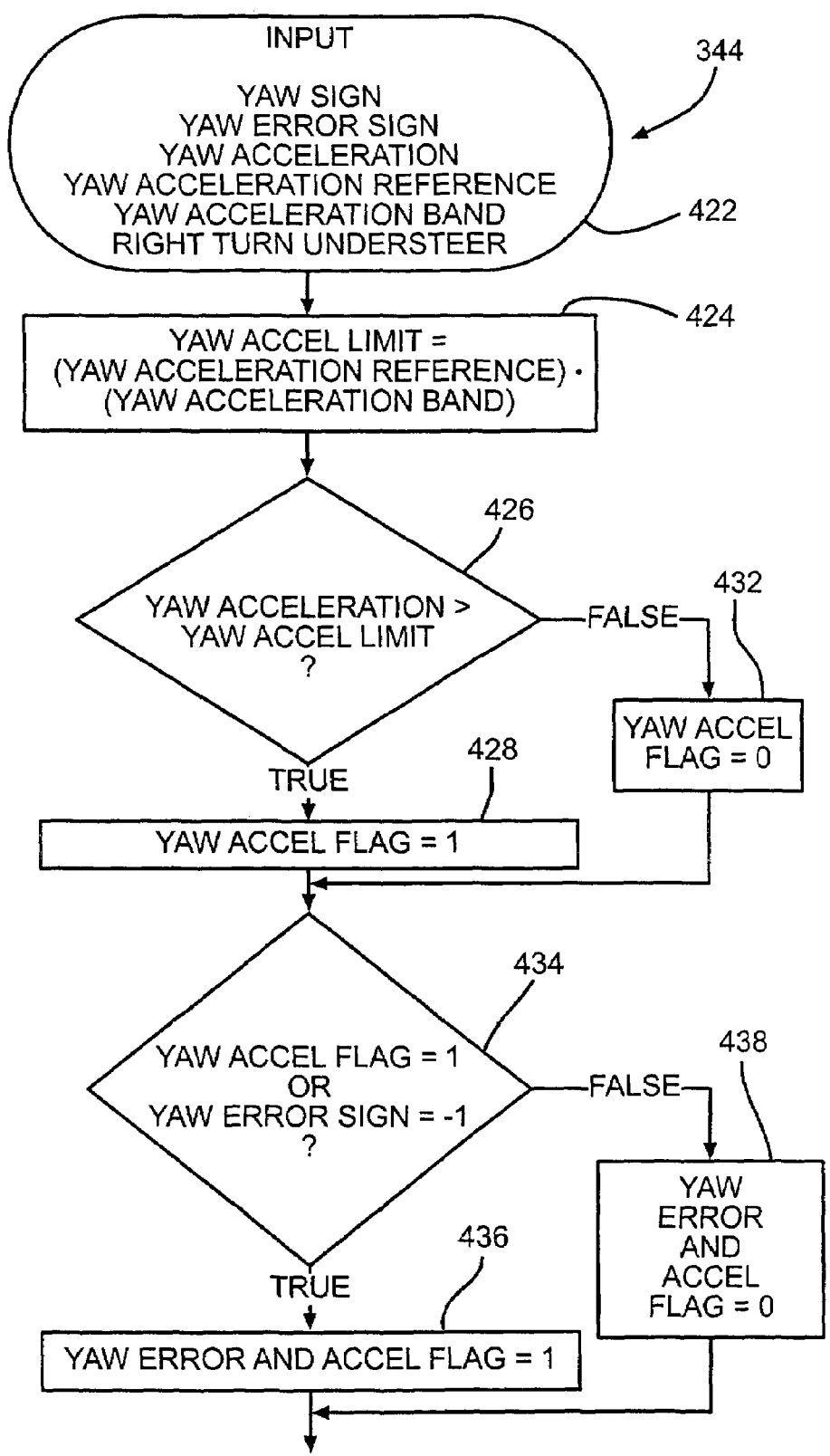
FIGS. 12A and 12B are flow charts relating to the right turn oversteer detection subroutine illustrated in FIG. 9B.
Figure 12B:
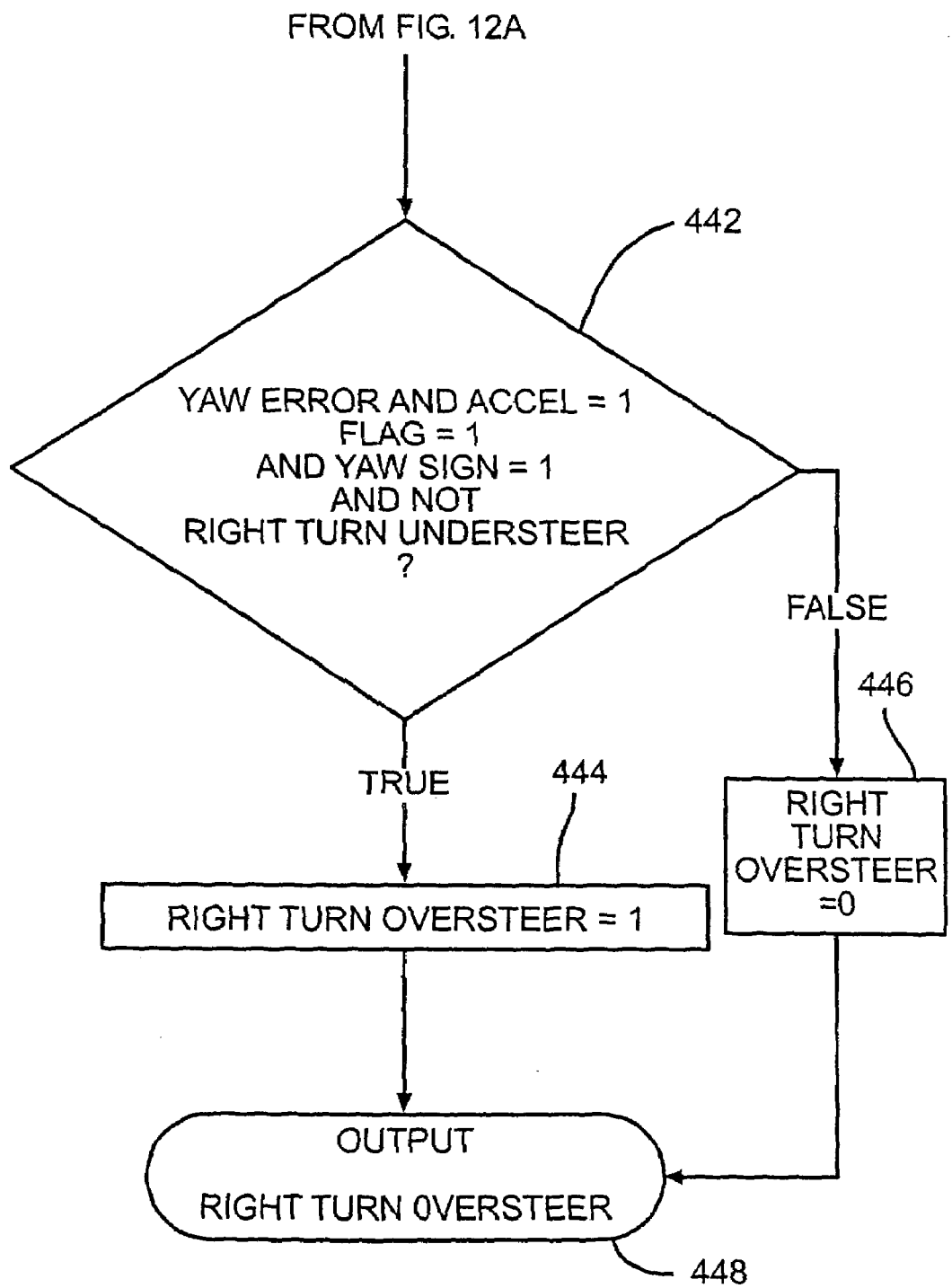

Turning now to FIGS. 12A and 12B, it will be appreciated that the right turn oversteer detection subroutine 344 which is referenced in FIG. 9B includes an initialization step 422 which reads the yaw sign, the yaw error sign, the yaw acceleration, the yaw acceleration reference, the yaw acceleration band and the right turn understeer output 410 from the right turn understeer detection subroutine 342. Next, a process step 424 is entered which computes the yaw acceleration limit which is the product of the yaw acceleration reference and the yaw acceleration band which was set in the process step 338 in the clutch selector logic subroutine 304. Next, a decision point 426 is entered which determines whether the currently detected yaw acceleration is greater than the just computed yaw acceleration limit. If it is, the decision point 426 is exited at TRUE and in a process step 428, a yaw acceleration flag or value is set to one or TRUE. If the yaw acceleration is not greater than the yaw acceleration limit, the decision point 426 is exited at FALSE and the yaw acceleration flag is set to zero or null in a process step 432. Next, a decision point 434 is entered which determines whether either the yaw acceleration flag is set or equal to one or the yaw error sign is minus one. If either of these statements is true, the decision point 434 is exited at TRUE and the process step 436 sets a yaw error and acceleration flag on or equal to one. If the inquiry in the decision point 434 is not true, it is exited at FALSE, a process step 438 is entered and the yaw error and acceleration flag is set to zero or null.

Continuing on to FIG. 12B, a decision point 442 is entered and an inquiry is made which determines whether the yaw error and acceleration flag is set equal to one and the yaw sign is equal to one and there is not right turn understeer. If this statement is true, the decision point 442 is exited at TRUE and a right turn oversteer flag or value is set to one in a process step 444. If the statement in decision point 442 is FALSE, a process step 446 is entered which sets a right turn oversteer value or flag to zero. The right turn oversteer detection subroutine 344 ends in an output value or signal for the right turn understeer which is either zero or one and this value is provided to the clutch selector logic illustrated in FIG. 9B.

Figure 13A:
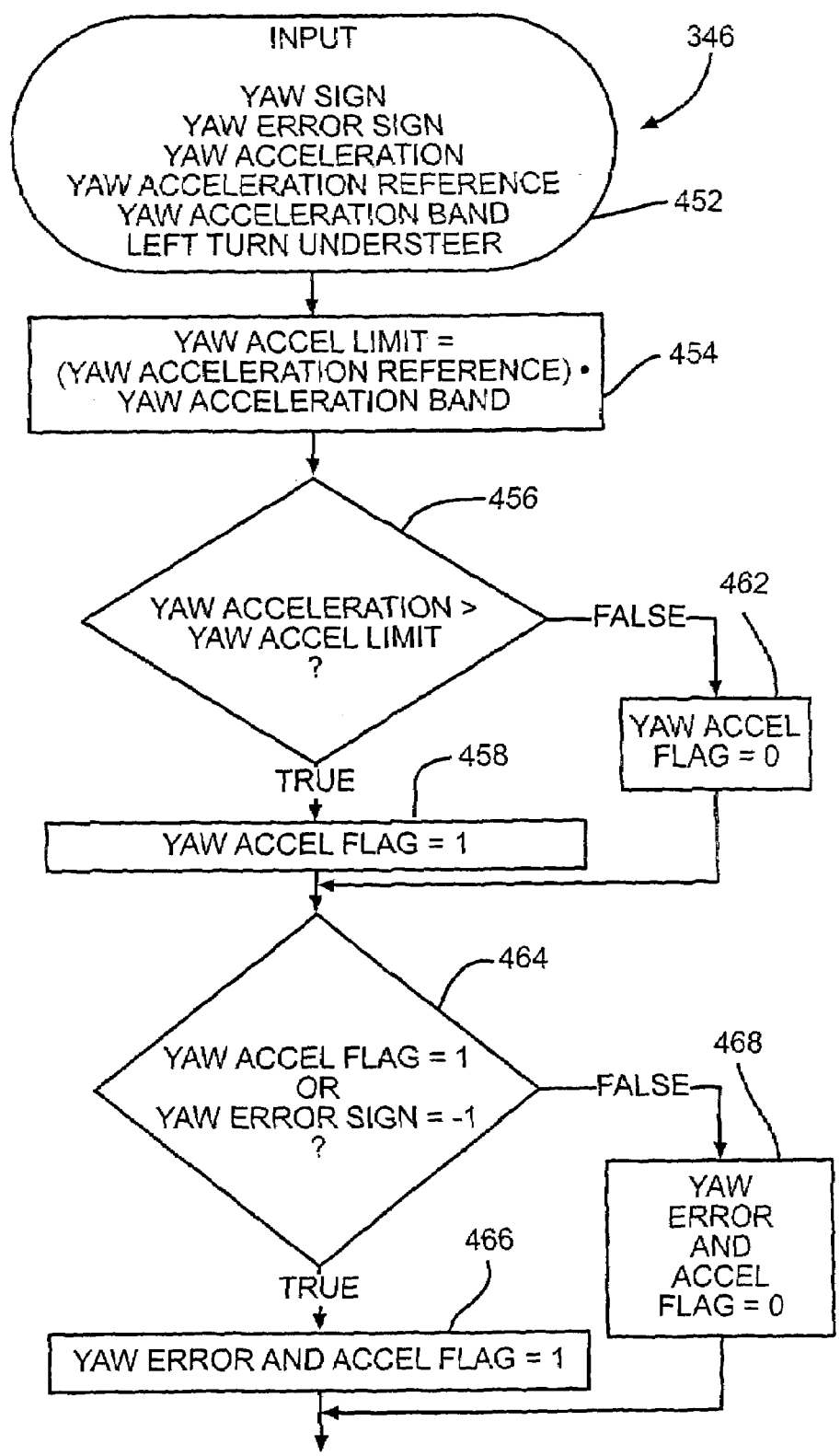
FIGS. 13A and 13B are flow charts relating to the left turn oversteer detection subroutine illustrated in FIG. 9B.
Figure 13B:
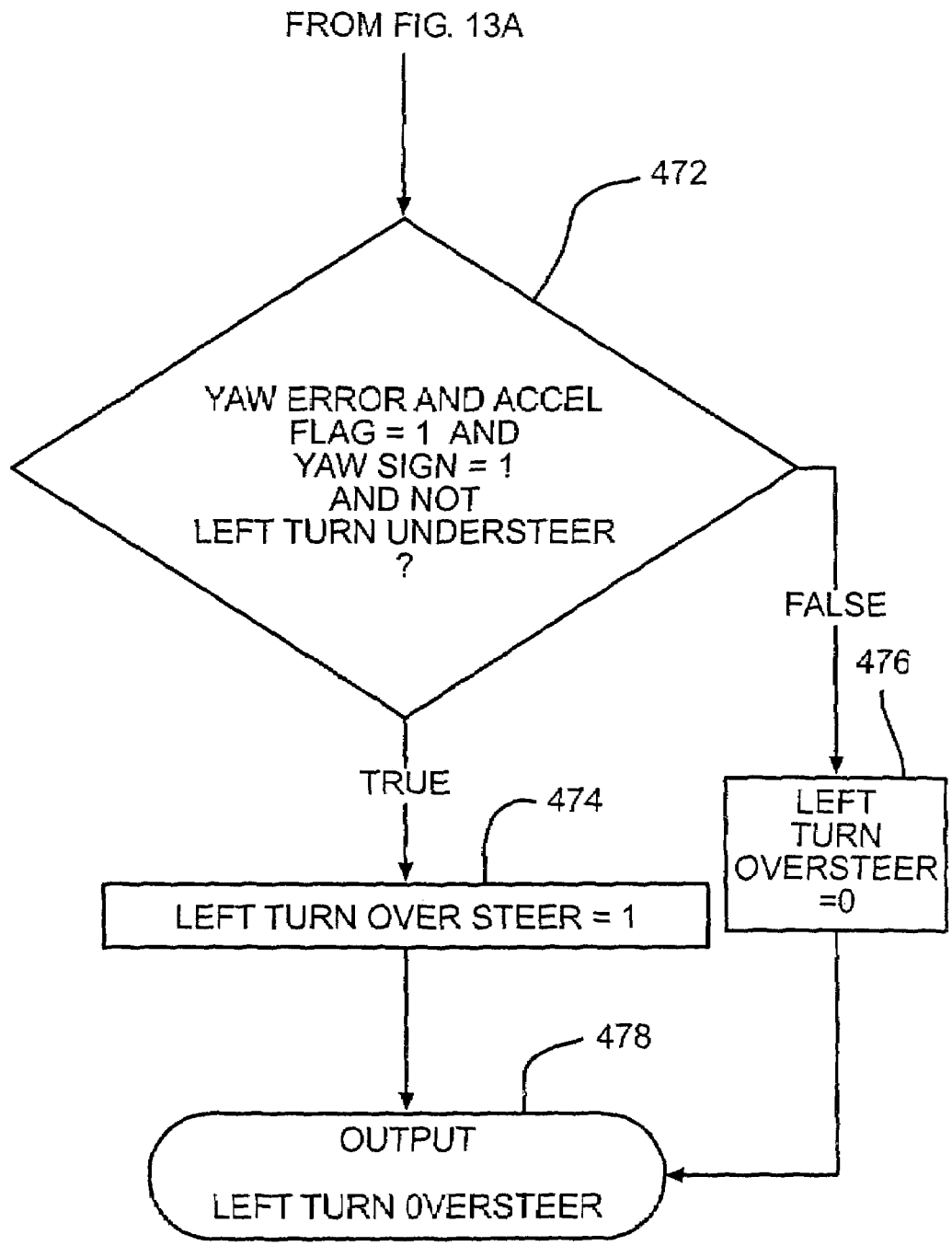

Turning now to FIGS. 13A and 13B, a left turn oversteer detection subroutine 346 is illustrated which is essentially similar to the right turn oversteer detection subroutine 344 illustrated in FIGS. 12A and 12B. However, for purposes of clarity and completeness, the left turn oversteer detection subroutine 346 will be fully described. In an input and initializing step 452, signals representing the yaw sign, the yaw error sign, yaw acceleration, the yaw acceleration reference, the yaw acceleration band and left turn understeer flag or value are provided and initialized. The left turn oversteer detection subroutine 346 then enters a process step 454 which computes a yaw acceleration limit as the product of the yaw acceleration reference and the yaw acceleration band. Next, a decision point 456 is entered which determines whether the yaw acceleration is greater than the yaw acceleration limit. If it is, the decision point 456 is exited at TRUE and a process step 458 is entered which sets a yaw acceleration flag or value equal to one. If the yaw acceleration is not greater than the yaw acceleration limit, the decision point 456 is exited at FALSE and a process step 462 sets a yaw acceleration flag or value equal to zero.

Next, a decision point 464 is entered which determines whether the yaw acceleration flag is set and equal to one or the yaw error sign equals minus one. If either of these statements are TRUE, the decision point 464 is exited at TRUE and a yaw error and acceleration value or flag is set at one in a process step 466. If the interrogation in the decision point 664 is answered in the negative, it is exited at FALSE and a process step 468 sets a yaw error and acceleration flag or value to zero. Continuing on to FIG. 13B, a decision point 472 is entered which inquires whether the yaw error and acceleration flag is set to one, whether the yaw sign is set to one and that there is not a left turn understeer. If all of these conditions are true, the decision point 472 is exited at TRUE and a process step 474 sets a left turn oversteer value or flag to one. If the statement is not true, the decision point 472 is exited at FALSE and a process step 476 sets a left turn oversteer value or flag to zero. An output step 478 provides a left turn understeer value or flag to the clutch selector logic illustrated in FIG. 9B.

Referring now to FIGS. 3, 14A, 14B and 14C, the arbitrator module 256 selects how the overall system will operate and brokers or arbitrates the data provided by the left and right traction controller modules 250A and 250B and the dynamics controller module 252. As such, it includes a selector 502 which determines the mode of operation of the arbitrator module 256. In mode one, the multi-port switch 504 is in position one and selects data based upon speed and steering wheel angle. In operational mode two, it utilizes reference yaw rate with speed and in operational mode three, it utilizes reference yaw rate. As such, it is provided with data from the steering wheel angle sensor 52 of which the absolute value is taken by appropriate mathematical manipulation in a device 506. This absolute value is provided to a comparator or relational operator 508. A decision steering wheel angle threshold or reference 510 also provides a value to the relational operator 508. The decision steering wheel angle reference 510 is a tunable parameter that may be empirically or experimentally selected or determined from a range of zero up to the maximum steering wheel angle. The relational operator 508 determines whether the steering wheel angle from the sensor 52 is less than the decision steering wheel angle threshold or reference 510. If it is, a one or positive logic signal is provided to a logical OR operator 512. If the value of the steering wheel angle from the sensor 52 is more than the decision steering wheel angle threshold or reference 510 a zero or null logic signal is outputted by the relational operator 510.

Similarly, the vehicle speed from a previous calculation or an average from the four speed sensors 56, 58, 60 and 62 and a decision vehicle speed threshold or reference 514 also provides a vehicle speed value to a relational operator or comparator 518. The decision vehicle speed threshold 514 is a tunable parameter that may be empirically or experimentally selected or determined from a range of zero up to the nominal or actual maximum vehicle speed. The relational operator 518 determines whether the current vehicle speed is less than or equal to the decision vehicle speed threshold 514. If it is, a one or positive logic signal is provided to an input of the logical OR operator 512 and one input of another logical OR operator or device 522. If the current vehicle speed is greater than the decision vehicle speed threshold 514, the relational operator 518 outputs a logic zero or null signal to the logical OR operators 512 and 522.

Both the logical OR operator 512 and the logical OR operator 522 operate conventionally and provide a positive or logic high or one output when either or both of their inputs receive positive or logic high or one inputs.

Signals from the logical OR operators 512 and 522 are provided to mode positions one and two, respectively, of the multi-port switch 504. Depending upon the selected arbitrator mode, the selected output of the multi-port switch 504 is then provided to and controls a switch 524 which selects either slip control torque from the traction controller modules 250A and 250B or yaw control torque from the dynamics controller module 252. The output of the switch is the arbitrated torque which is provided to the smart actuator modules 258A and 258B.

Figure 14B:
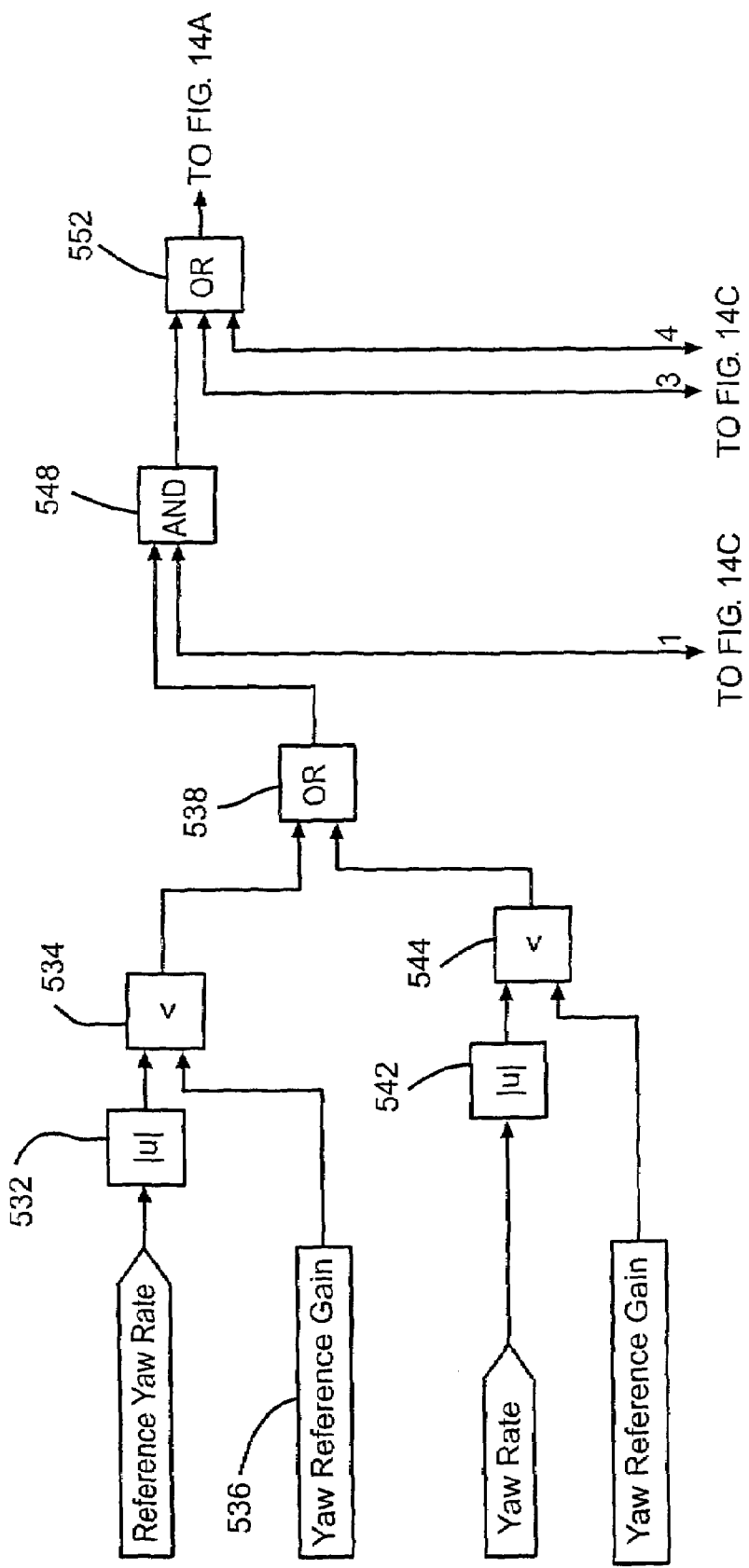
Figure 14C:
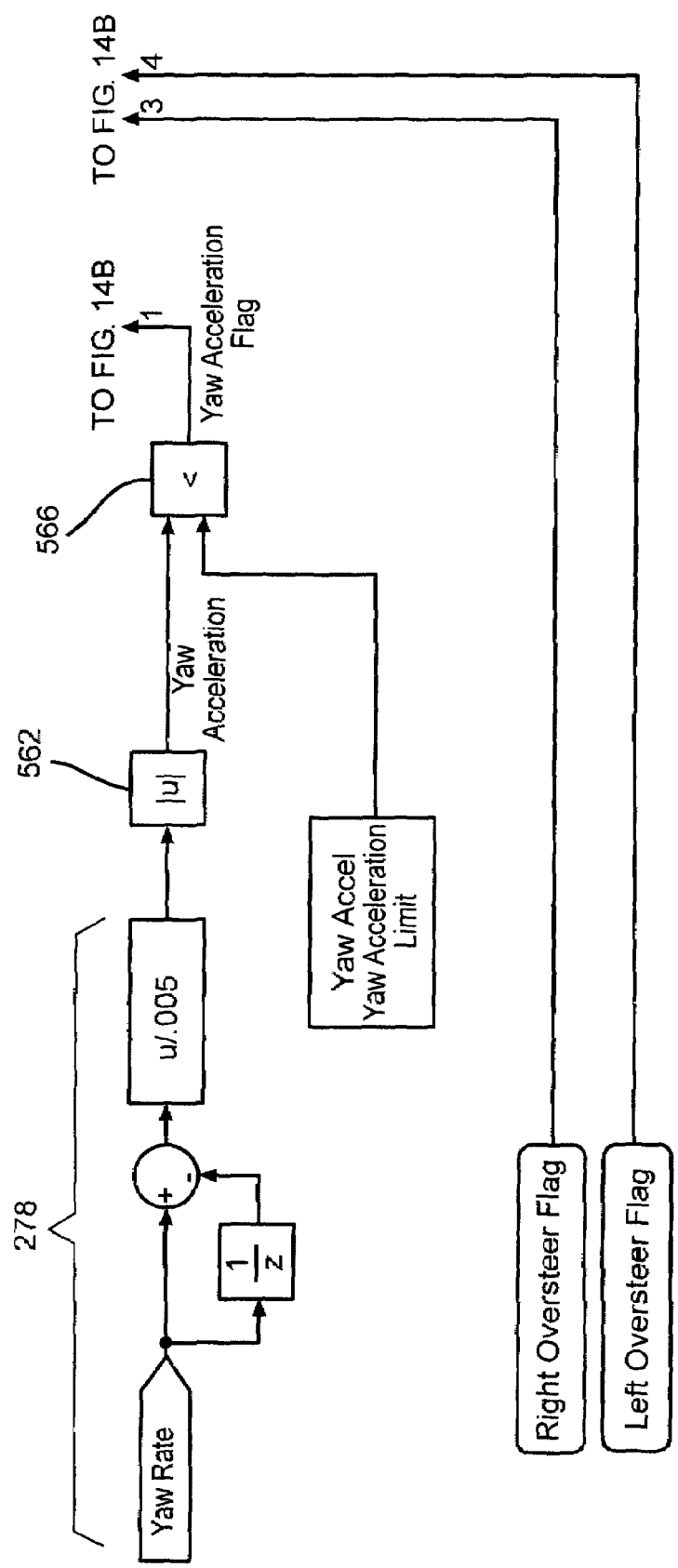

FIG. 14B illustrates additional components of the arbitrator module 256. The previously computed reference yaw rate is provided to an absolute value operator 532 and the absolute value of the reference yaw rate is provided to one input of a relational operator or comparator 534. A yaw reference gain value 536 is also provided to the relational operator 534. The yaw reference gain is a tunable parameter that may be empirically or experimentally selected or determined and has a value between zero and a maximum value. If the absolute value of the reference yaw rate is les than the yaw reference gain, the relational operator 534 provides a positive logic high or one value to one input of a logical OR operator 538. If the absolute value of the reference yaw rate is greater than the yaw reference gain value 536, the relational operator 534 outputs a logic zero or null signal to one input of the logical OR operator 538.

Similarly, the current yaw rate is provided to an absolute value operator 542 and this absolute value is then provided to one input of a relational operator or comparator 544. Provided to the other input of the relational operator 544 is the yaw reference gain value 536A described directly above. This, as noted, is an empirically or experimentally determined value and preferably is the same as but may be different from the yaw reference gain value 536. If the absolute value of the yaw rate is less than the value of the yaw reference gain 536A, the relational operator 544 provides a positive logic or one value to the other input of the logical OR operator 538. When one or both logic inputs to the logical OR operator 538 are positive or one, the logical OR operator provides a positive or one logic signal to one input of a three input logical AND operator 548. A logical OR operator 552 having three inputs receives the logic output from the three input logical AND operator 548 on one of its three inputs Turning now to FIG. 14C, the proportional, integral derivative (PID) controller 278 illustrated in FIG. 5 which also relates to the process step 324 appearing in FIG. 8 is presented. This utilizes a yaw rate signal which is then provided to an absolute value operator 562 and yaw acceleration and a yaw acceleration limit 568 are provided to a relational operator 566. The relational operator 566 determines whether the yaw acceleration is less than or equal to the empirically or experimentally generated value of the yaw acceleration limit 568. If it is less, a yaw acceleration flag is set and the data is provided to the logical AND operator 548 illustrated in FIG. 14B. In the lower portion of FIG. 14C, right oversteer flags and left oversteer flags are set and this data is provided to the logical OR operator 552 illustrated in FIG. 14B. If all three signals to the logical AND operator 548 are positive or TRUE, a signal is provided to one of the inputs of the logical or operator 552. If any one of the inputs of the logical or operator 552 are a logic high, a logic high output is provided to logical or operator 522 illustrated in FIG. 14A as well as the third portion of the multi-port switch 504.

The foregoing disclosure is the best mode devised by the inventors for practicing this invention. It is apparent, however, that apparatus incorporating modifications and variations will be obvious to one skilled in the art of motor vehicle rear axle components and control systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. An apparatus for controlling yaw in a motor vehicle comprising, in combination:
a rear axle having an input adapted to receive drive torque and drive a pair of independently operable clutches adapted to drive a respective one of a pair of rear axles;
a plurality of speed sensors for sensing speeds of a plurality of tire and wheel assemblies;
a steering angle sensor;
a lateral acceleration sensor;
a yaw rate sensor; and
a microprocessor adapted to received signals from said sensors and provide first and second independent signals for actuating said pair of clutches, said microprocessor including a pair of traction controller modules each having inputs for said plurality of speed sensors and said steering angle sensor and providing a torque output signal, a dynamics controller module having inputs for said plurality of speed sensors, said steering angle sensor, said lateral acceleration and yaw rate sensor, a yaw rate reference calculation subroutine, an oversteer and an understeer detection subroutine and a clutch selector subroutine providing left and right control outputs and an arbitrator module having inputs for said outputs from said pair of traction controller modules and said dynamics controller module.

2. The apparatus of claim 1 wherein each of said pair of clutches includes an electromagnetic operator.

3. The apparatus of claim 1 wherein each of said pair of clutches includes a ball ramp operator.

4. The apparatus of claim 1 further including a first driveline including a transaxle, a pair of front axles, a pair of front tire and wheel assemblies and driving a rear propshaft.

5. The apparatus of claim 1 wherein said steering angle sensor senses rotation of a steering column of said vehicle.

6. The apparatus of claim 1 wherein said microprocessor includes a PWM driver circuit adapted to drive electromagnetic operators in said clutches.

7. The apparatus of claim 1 wherein said microprocessor computes a yaw acceleration value.

8. The apparatus of claim 1 wherein said microprocessor includes a proportional integral derivative controller.

9. A method of controlling yaw in a motor vehicle comprising the steps of:
sensing speeds of wheels of such motor vehicle;
sensing a throttle position of such vehicle,
sensing a position of a steering component of such vehicle;
sensing a yaw rate of such vehicle;
determining a fist torque value from said speeds, said steering position and throttle position,
determining at least one of left oversteer, right oversteer, left understeer and right understeer of such vehicle and providing left and right torque values;
arbitrating said first, left and right torque values and providing a pair of clutch signals;
providing a rear axle having an input member for receiving drive torque and driving a pair of independently operable clutches adapted to drive a respective one of a pair of rear wheels; and
activating said pair of clutches in response to said pair of respective clutch signals.

10. The method of controlling yaw in a motor vehicle of claim 9 further including the step of sensing lateral acceleration.

11. The method of controlling yaw in a motor vehicle of claim 9 further including the step of determining a yaw rate error signal.

12. The method of controlling yaw in a motor vehicle of claim 9 further including the step of determining a yaw acceleration value.

13. The method of controlling yaw in a motor vehicle of claim 9 further including the step of arbitrating between outputs of traction controllers and a dynamics controller.

14. A method of controlling yaw in a motor vehicle comprising the steps of:
sensing speeds of wheels of such motor vehicle;
sensing a throttle position of such vehicle;
sensing a position of a steering component of such vehicle;
sensing a yaw rate of such vehicle;
sensing lateral acceleration of such vehicle;
determining a first torque control output from said sensed speeds, said throttle position and said steering position;
determining left oversteer, right oversteer, left understeer and right understeer of such vehicle and providing left and right control torque outputs;
arbitrating said first, left and right torque control outputs and providing a pair of clutch drive signals;
providing a rear axle having an input member for receiving drive torque and driving a pair of independently operable clutches adapted to drive a respective one of a pair of rear wheels, and activating said clutches in response to said pair of clutch drive signals.

15. The method of claim 14 including the step of determining a yaw rate error signal.

16. The method of claim 15 further including the step of utilizing a proportional integral derivative controller to correct said yaw rate error signal.

17. The method of claim 14 including the step of determining a yaw acceleration value.

18. The method of claim 14 including the step of arbitrating between outputs of slip controllers and a yaw controller.

* * * * *

UNITED STATES PATENT AND TRADEMARK OFFICE
CERTIFICATE OF CORRECTION

| | | |
|---|---|---|
| PATENT NO. | : 7,007,763 B2 | Page 1 of 1 |
| APPLICATION NO. | : 10/666593 | |
| DATED | : March 7, 2006 | |
| INVENTOR(S) | : Brian B. Ginther et al. | |

It is certified that error appears in the above-identified patent and that said Letters Patent is hereby corrected as shown below:

In the Claims

Column 15, in claim 9, line 8, after "determining a" delete "fist" and substitute --first-- in its place.

Signed and Sealed this

Seventh Day of November, 2006

JON W. DUDAS
*Director of the United States Patent and Trademark Office*